United States Patent [19]

Haydu et al.

[11] 4,038,626
[45] July 26, 1977

[54] HIGH VOLTAGE CONTACTOR

[75] Inventors: John L. Haydu, Towson; Michel M. Fenneteau, Gaithersburg; Byron C. Mann, Kingsville, all of Md.

[73] Assignee: I-T-E Imperial Corporation, Spring House, Pa.

[21] Appl. No.: 585,774

[22] Filed: June 11, 1975

[51] Int. Cl.² ............................................. H01H 83/00
[52] U.S. Cl. ........................................ 337/4; 335/132; 361/194
[58] Field of Search ............... 337/4, 6; 335/202, 132, 335/128, 2; 200/147 R; 317/154, 120, 155

[56] References Cited

U.S. PATENT DOCUMENTS

| 3,403,239 | 9/1968 | Schramm et al. | 337/4 |
| 3,510,811 | 5/1970 | Pokorny et al. | 335/142 |
| 3,568,008 | 3/1971 | Tanimura et al. | 317/154 |
| 3,638,157 | 1/1972 | Kruzic | 337/6 |
| 3,921,109 | 11/1975 | Hodgson | 200/147 R |

FOREIGN PATENT DOCUMENTS

| 272,012 | 6/1927 | United Kingdom | 317/155 |
| 534,910 | 3/1941 | United Kingdom | 317/155 |

*Primary Examiner*—Harold Broome
*Attorney, Agent, or Firm*—Ostrolenk, Faber, Gerb & Soffen

[57] ABSTRACT

Contactors and housings therefor wherein the contactor is provided with blow-out coils brought into circuit by the arc; arc extinguishers; and fuses in series with the contacts; a closing and holding magnet for operating the contacts; anti-single-phasing operation to open the contacts in response to overload interruption by a fuse; the housings being of modular arrangement to form a uniform control center and being provided with racking means for inserting and removing the contactors with the door closed; and means for protecting the operator including the closing off of access to at least the line bus when the contactor is racked out and disabling the racking mechanism when the contactor contacts are closed.

32 Claims, 58 Drawing Figures

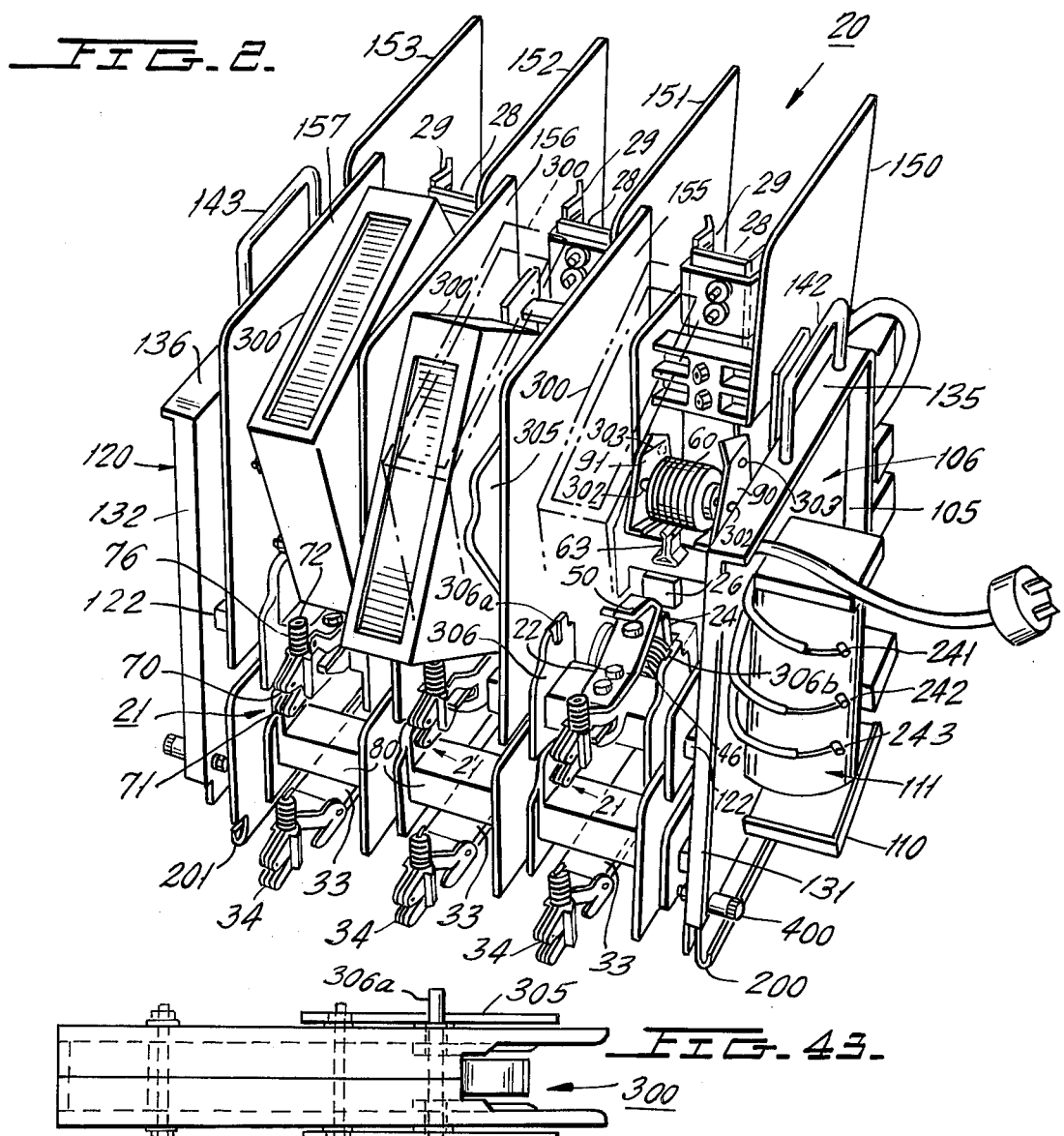
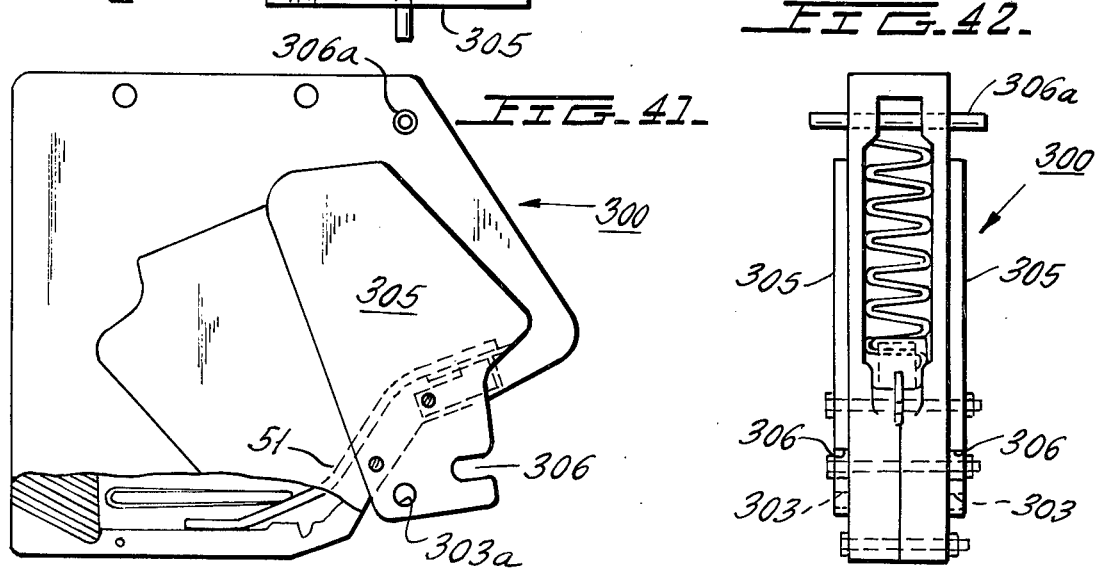

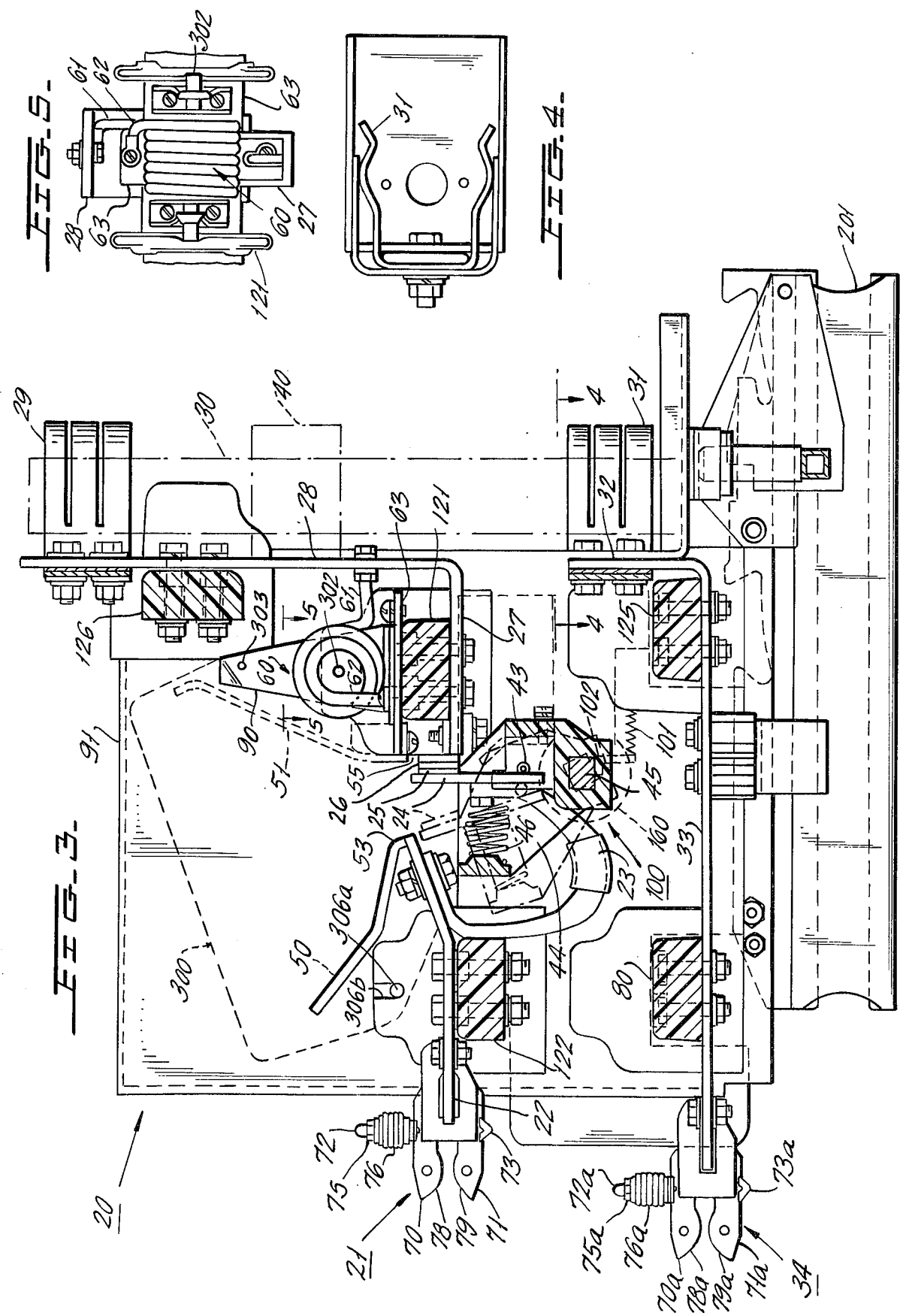

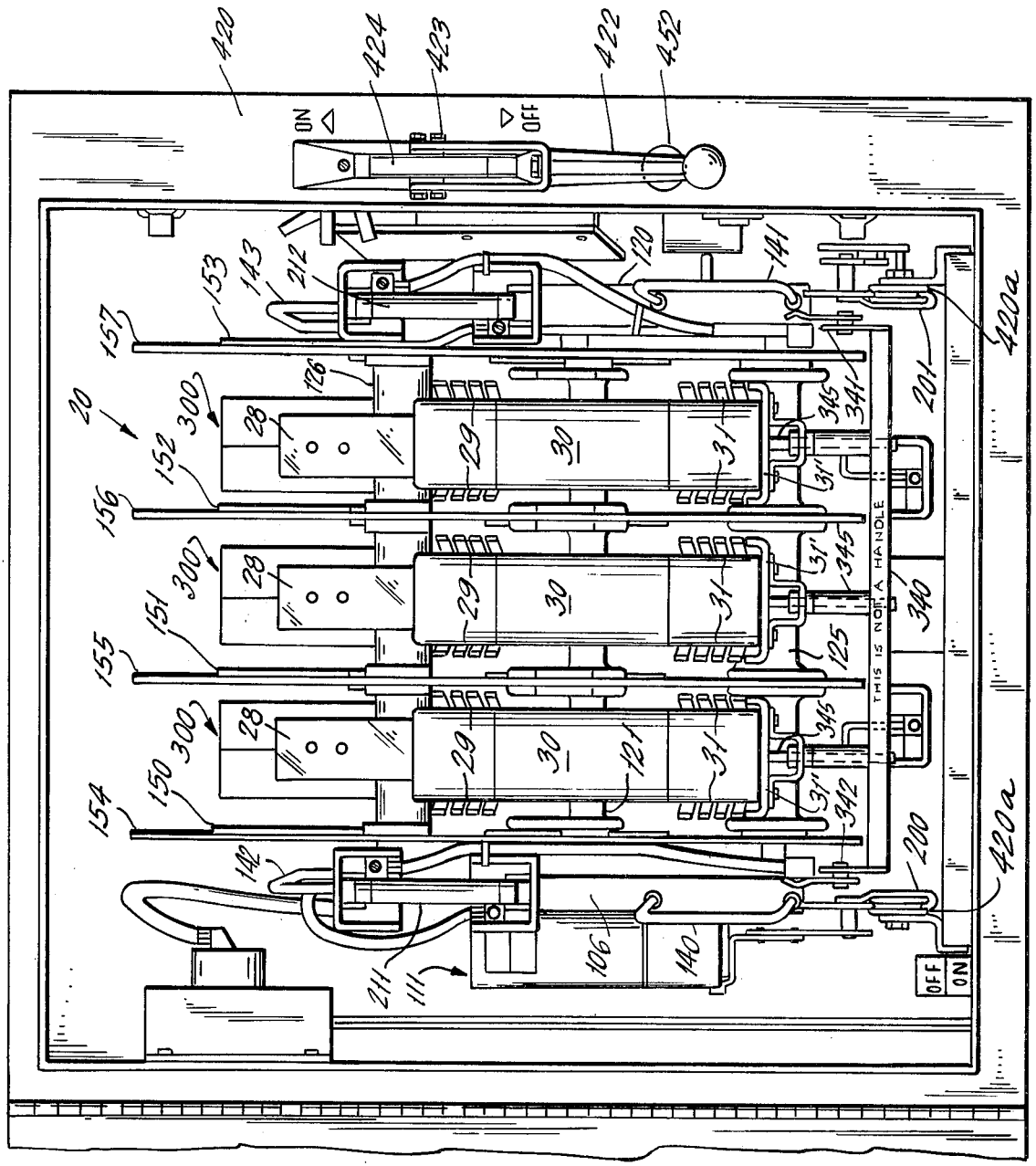

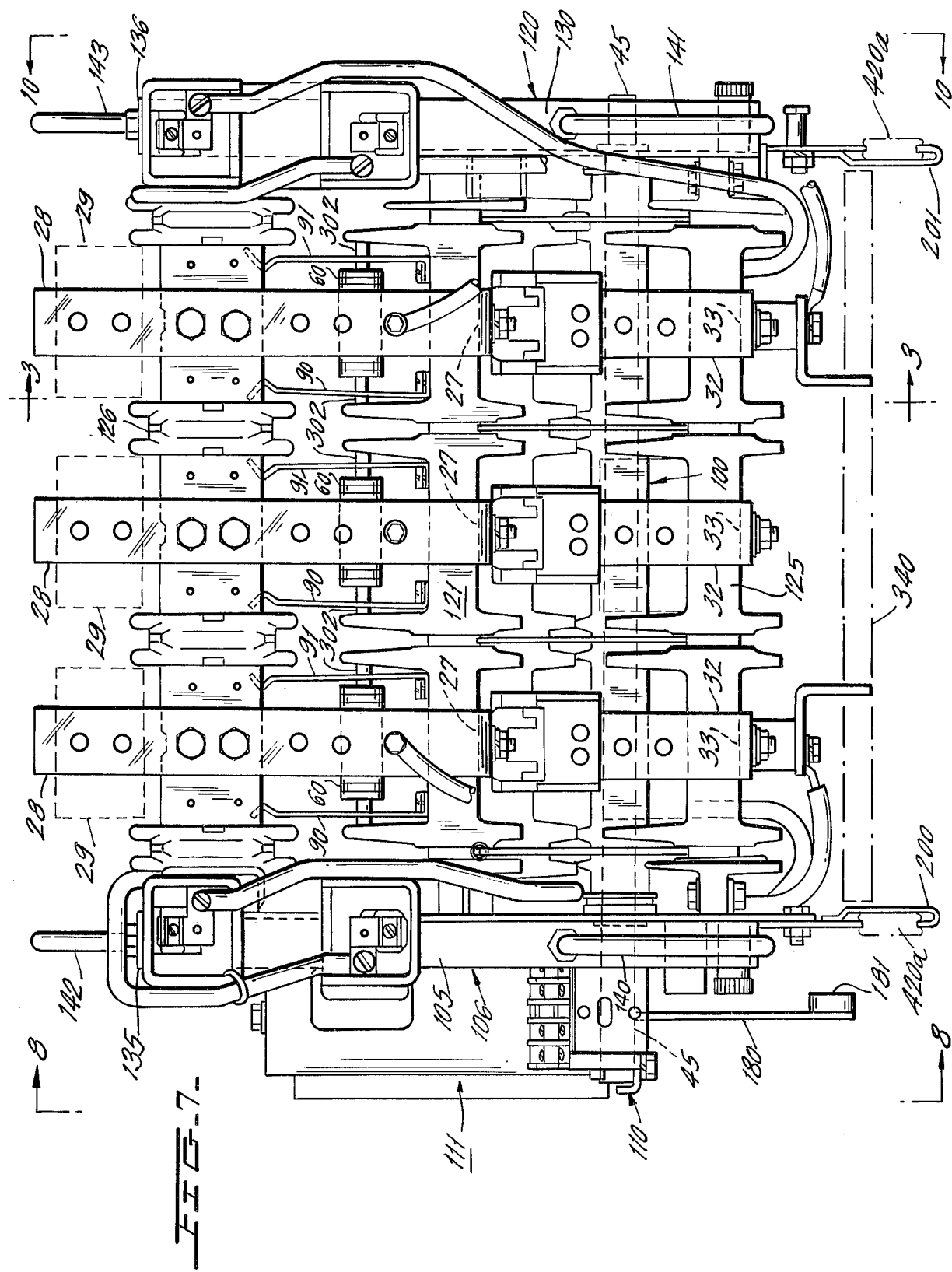

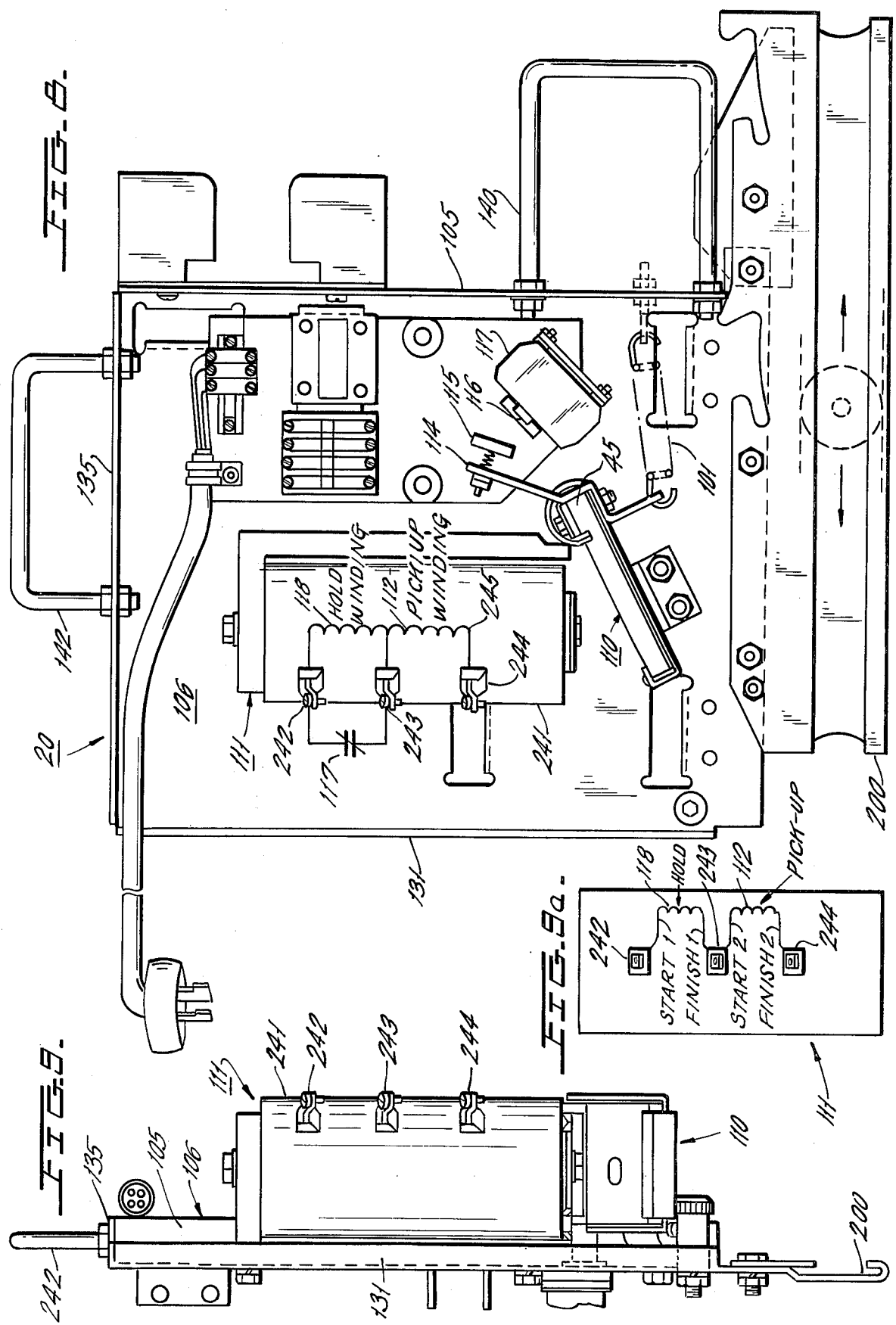

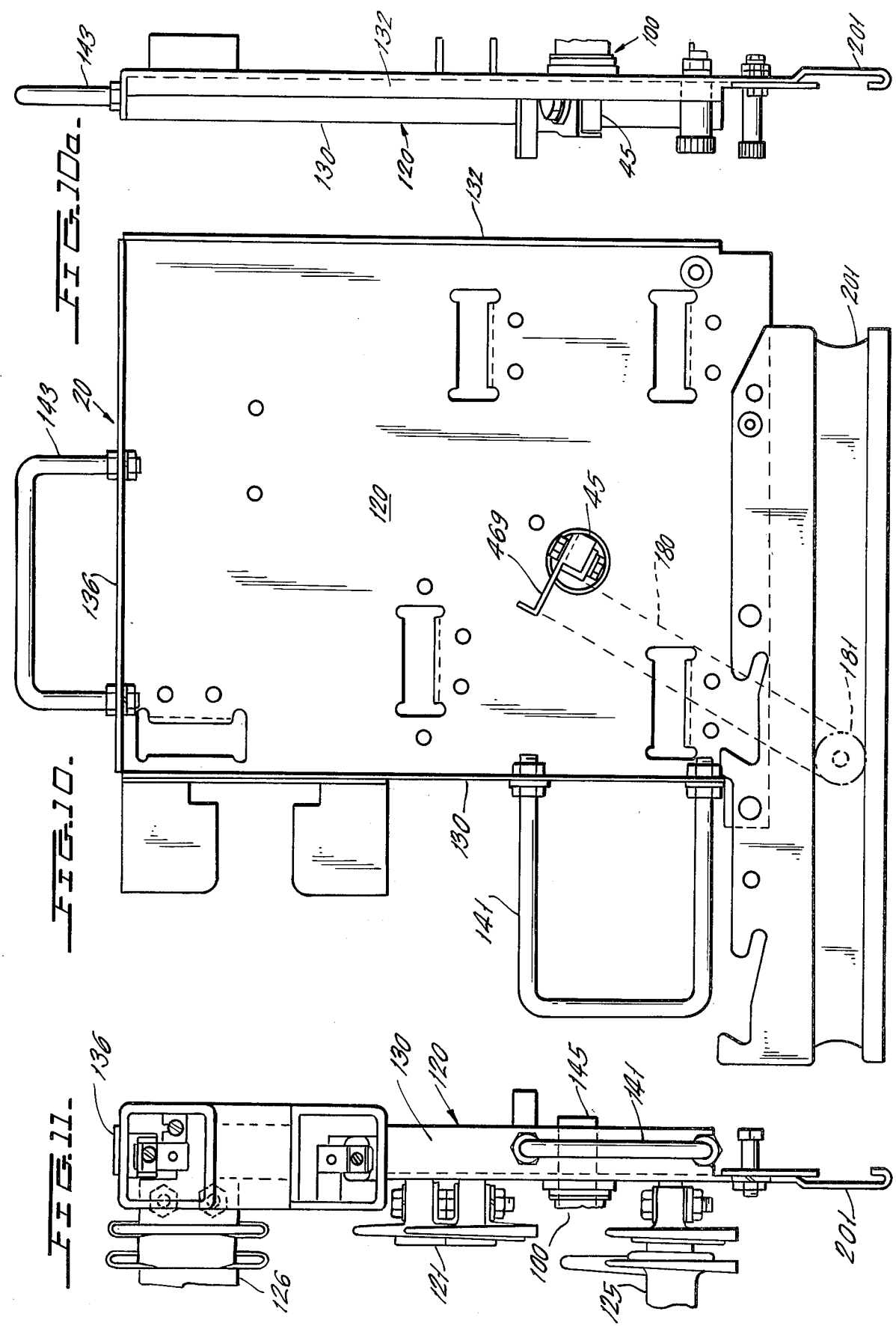

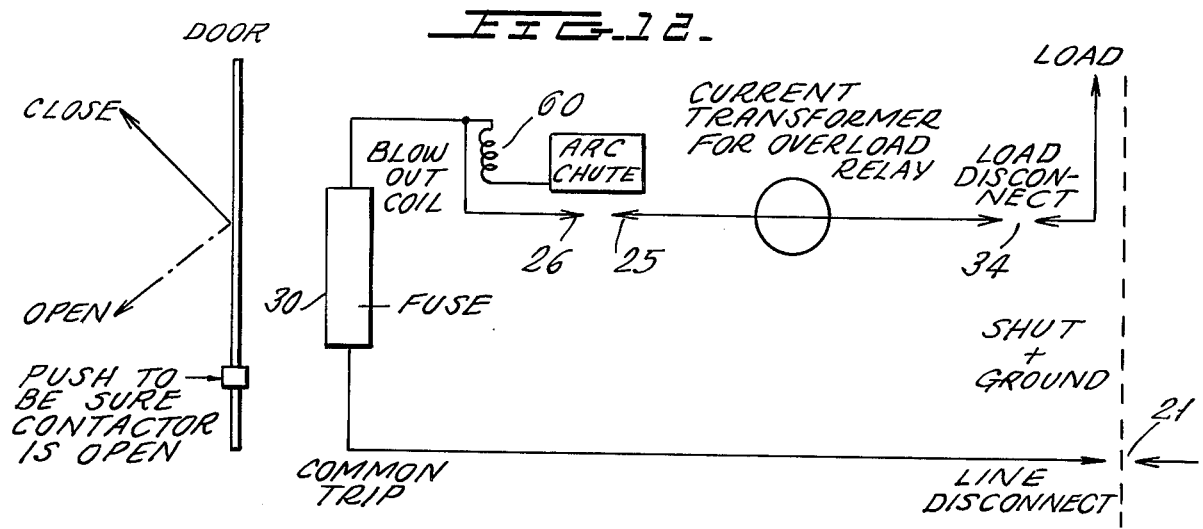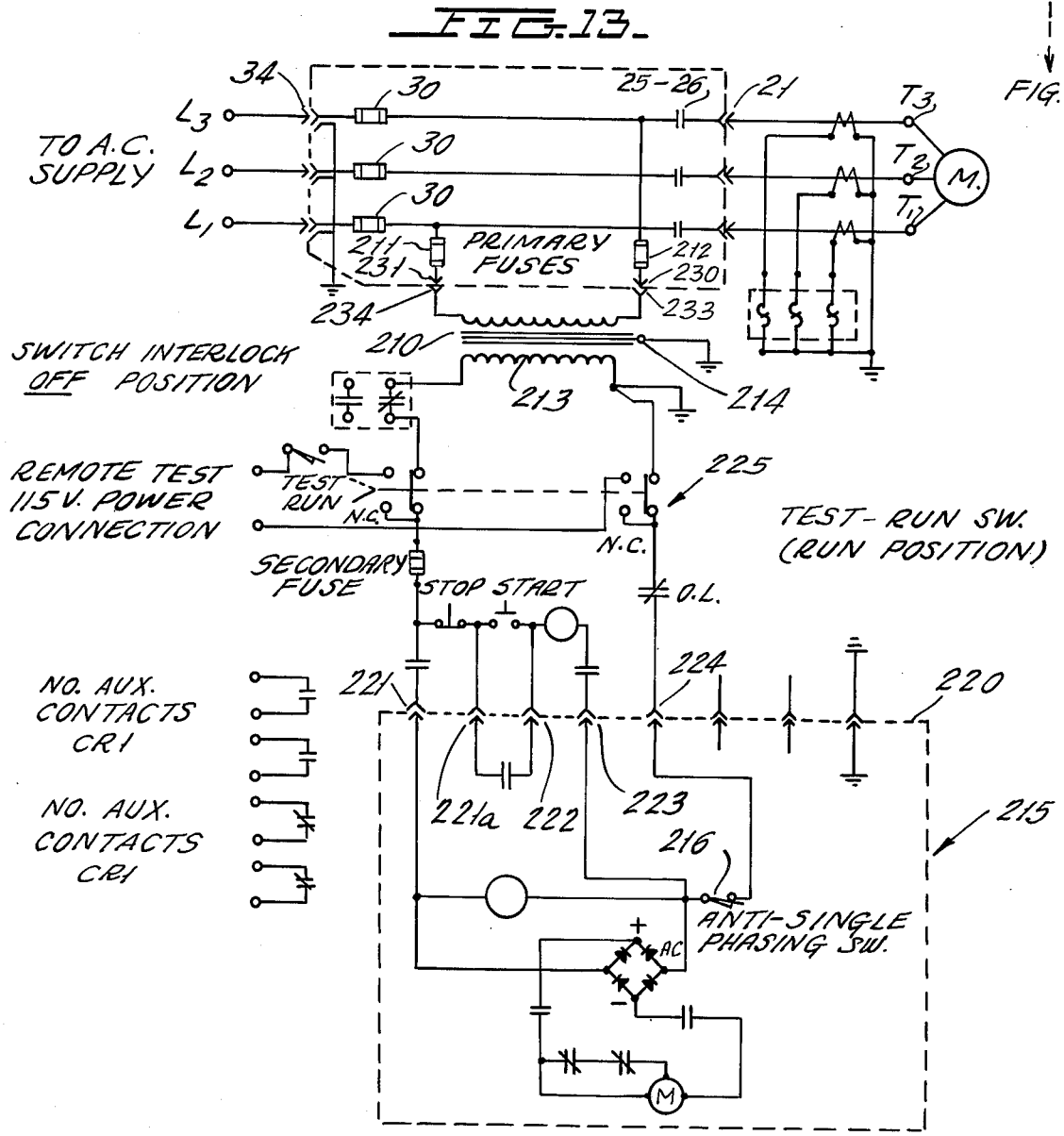

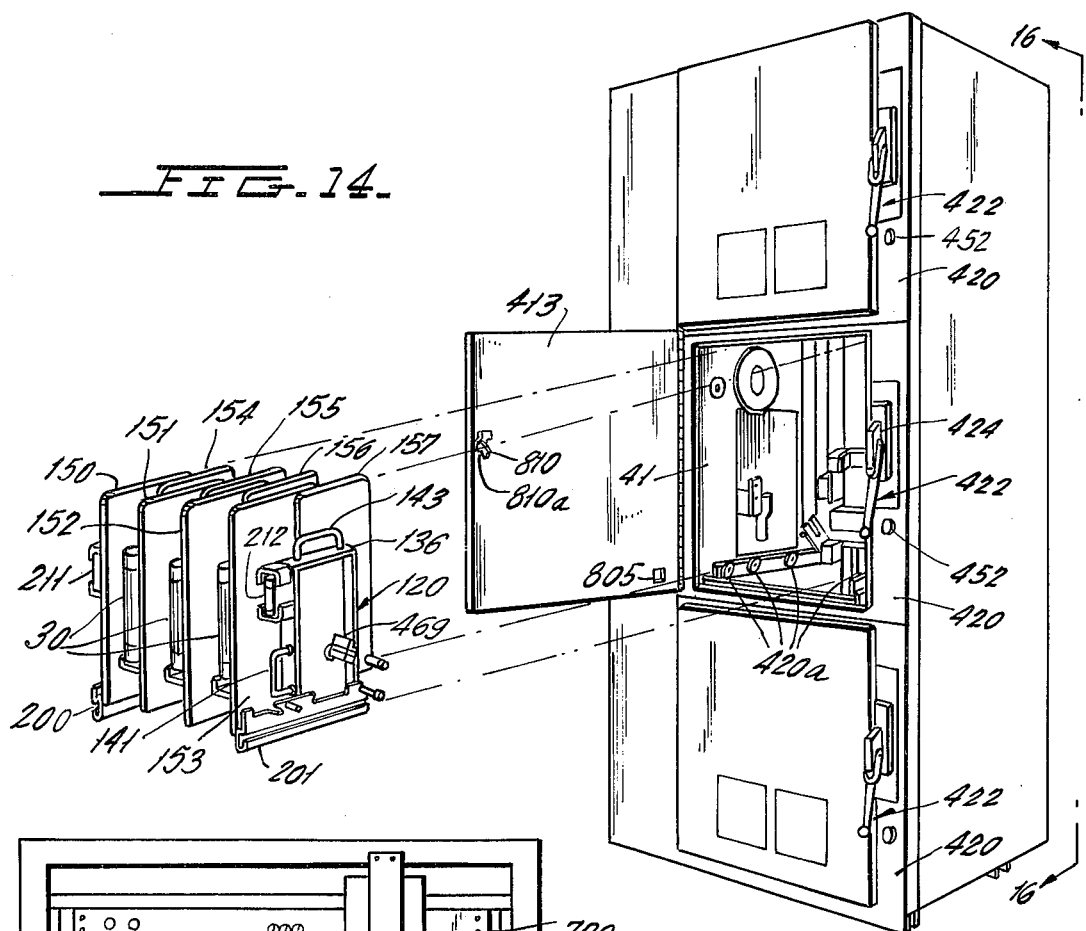
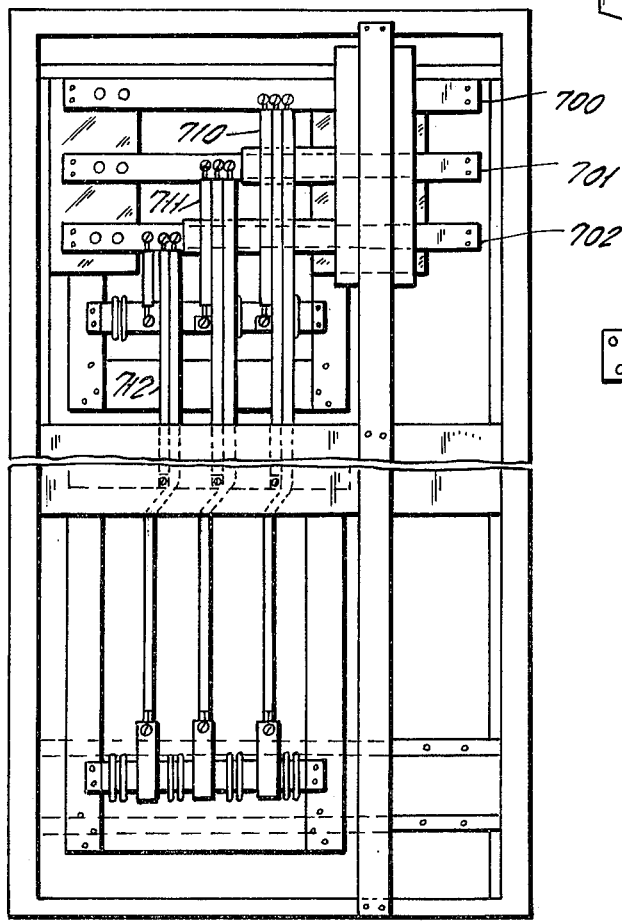

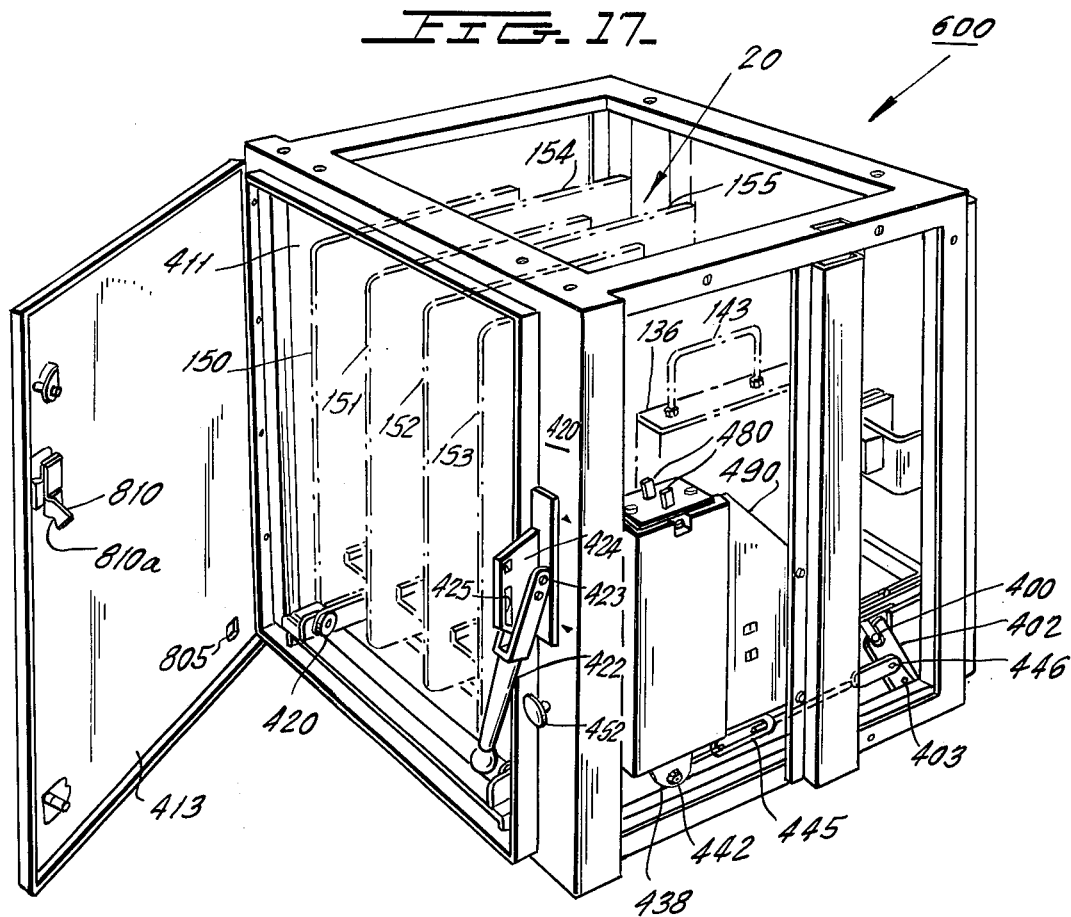
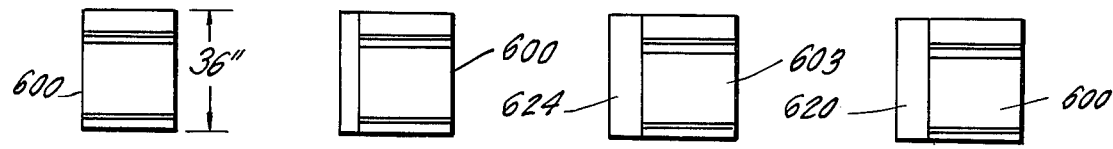
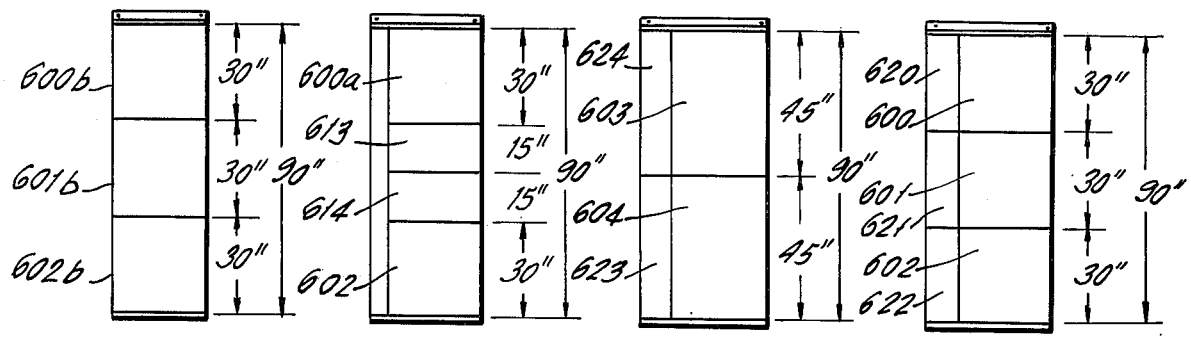

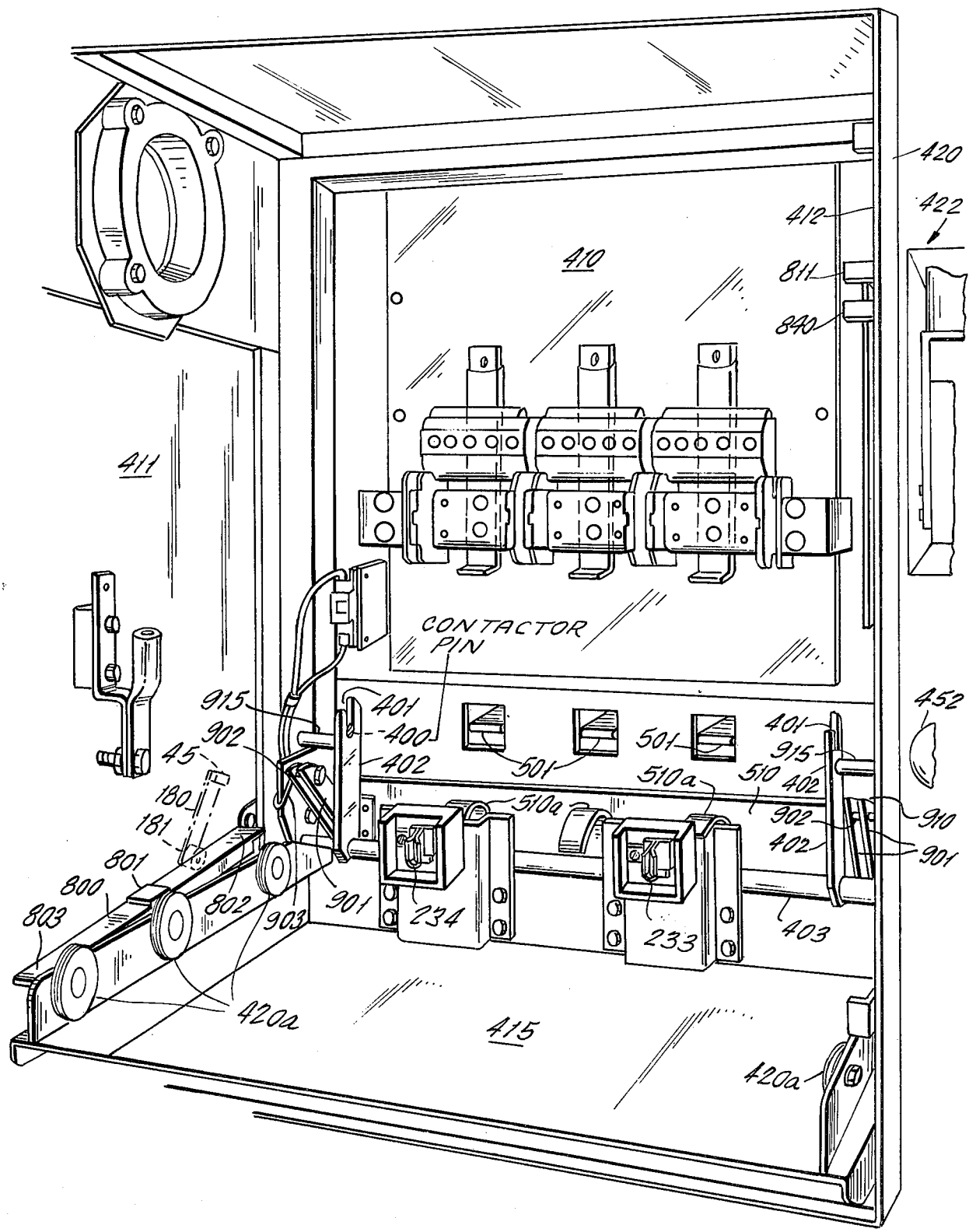

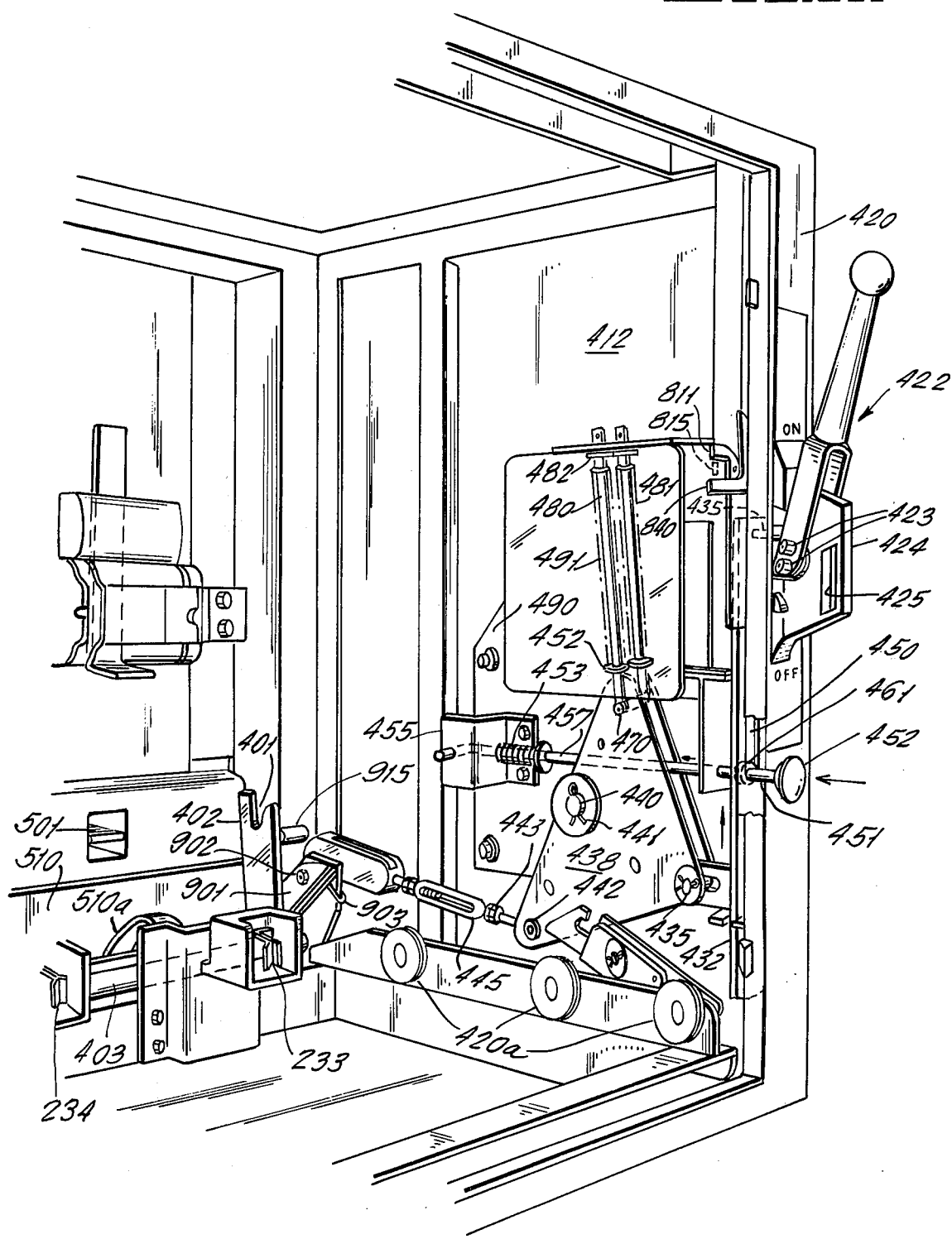

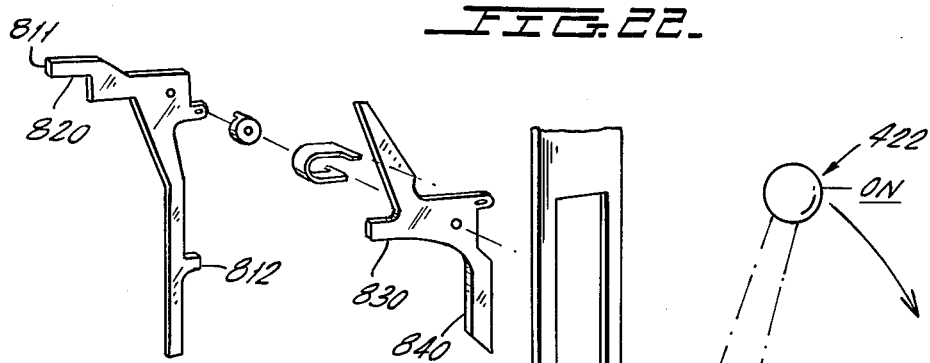
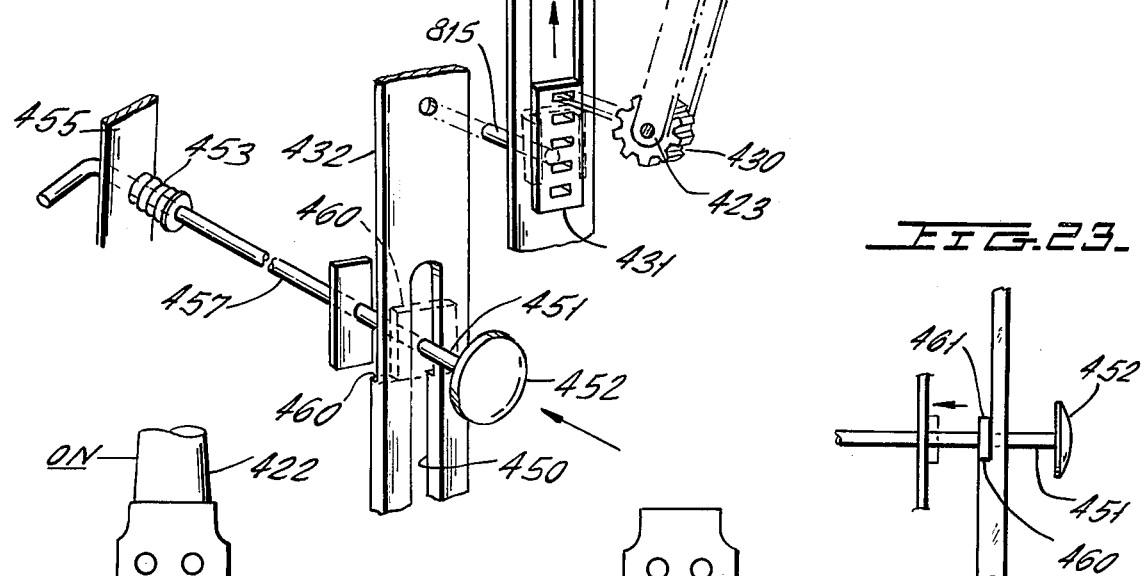
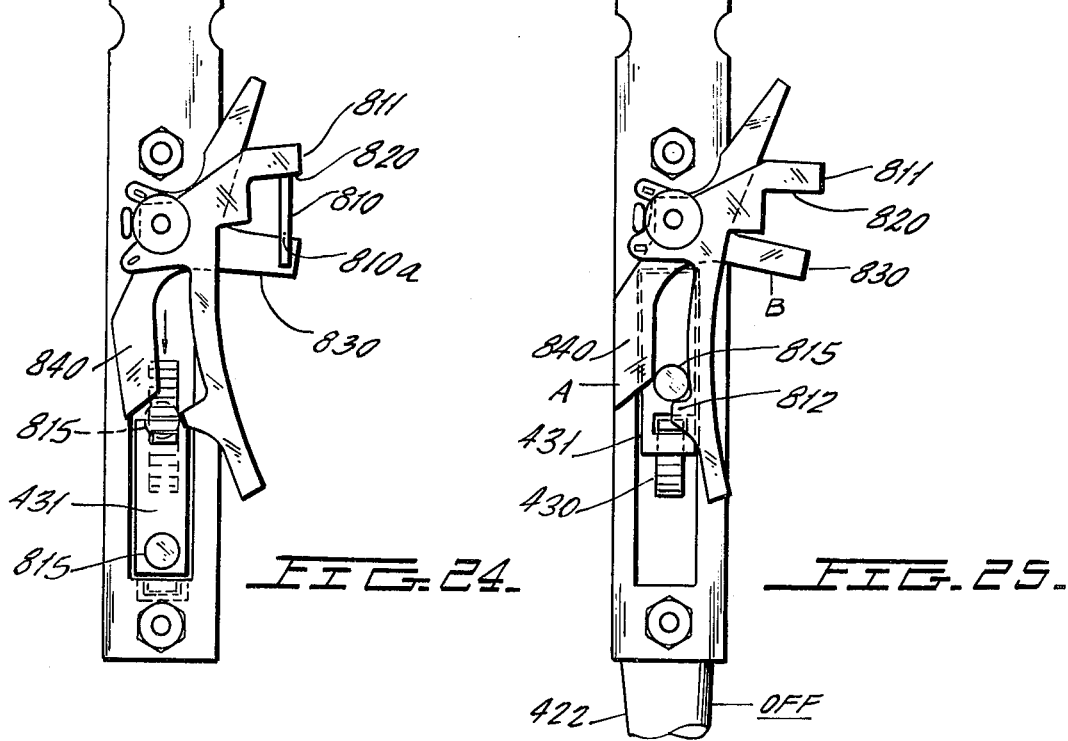
FIG. 22.
FIG. 23.
FIG. 24.
FIG. 25.

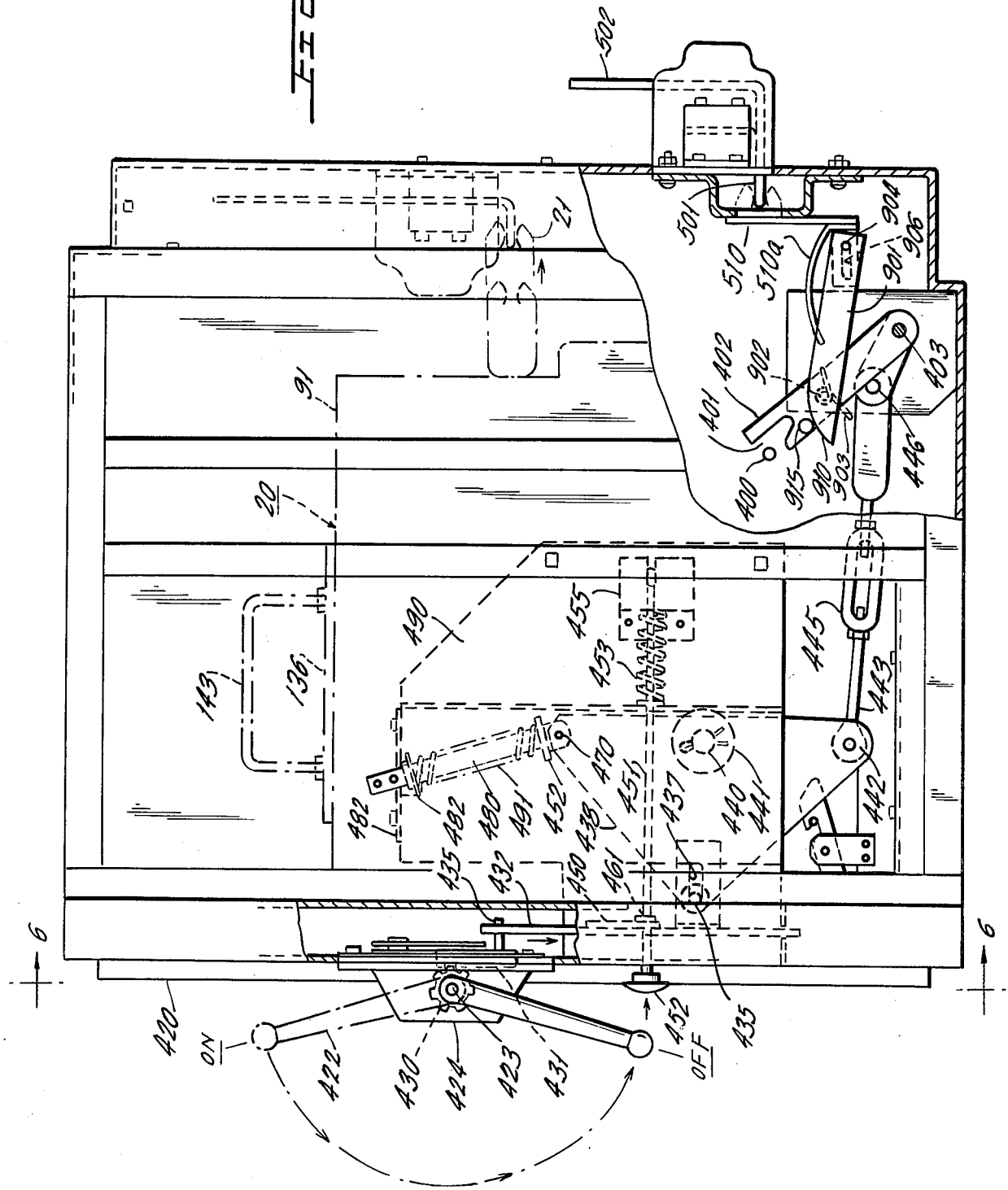

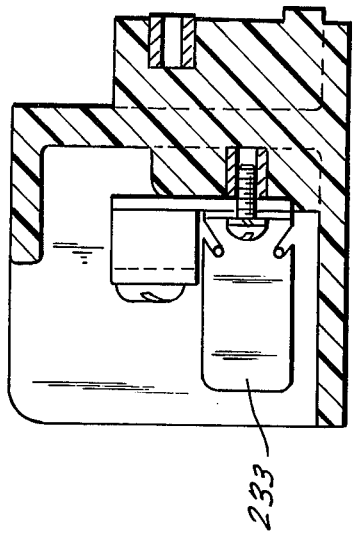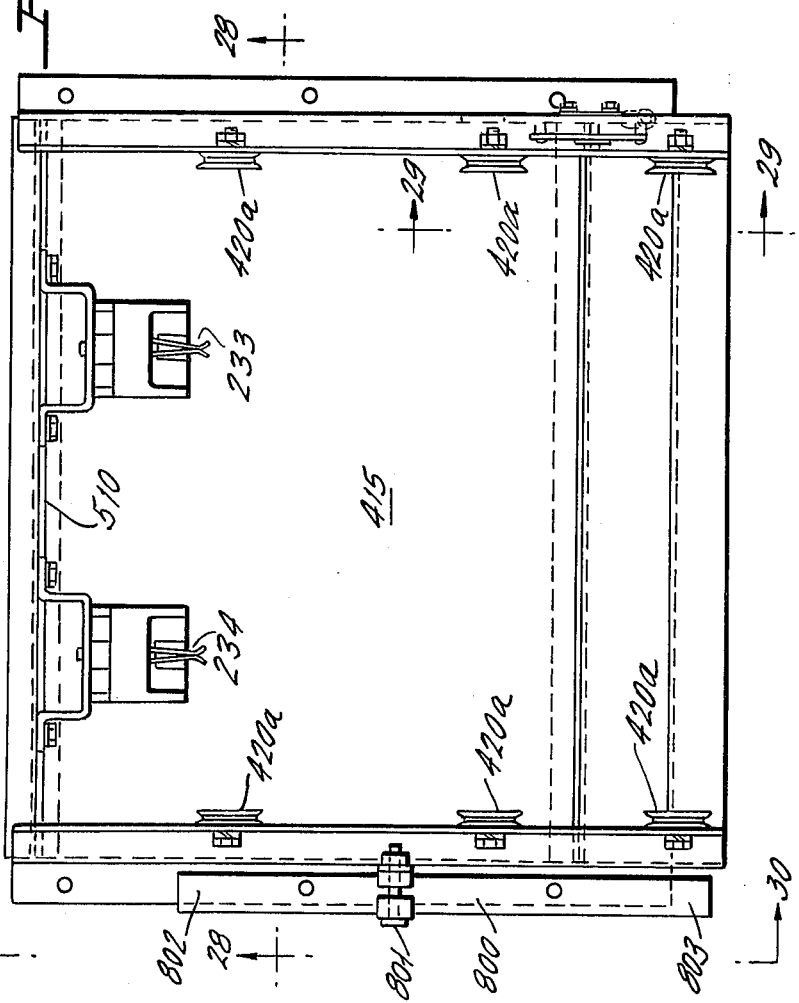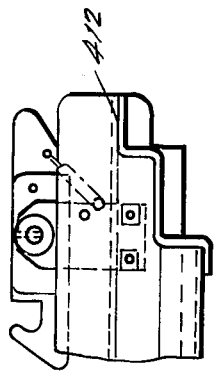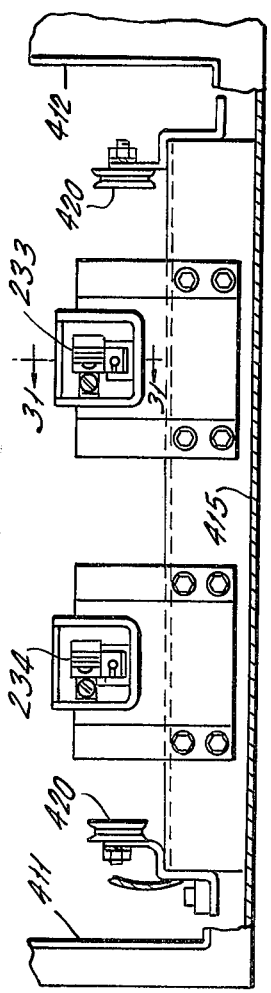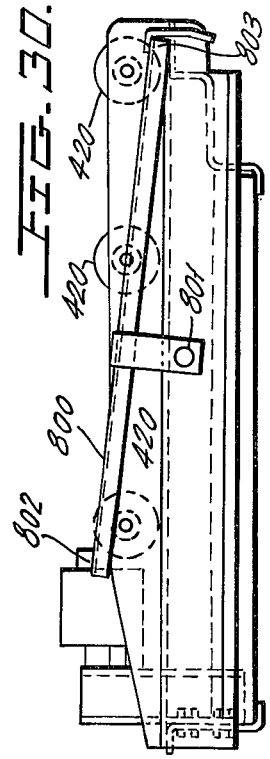

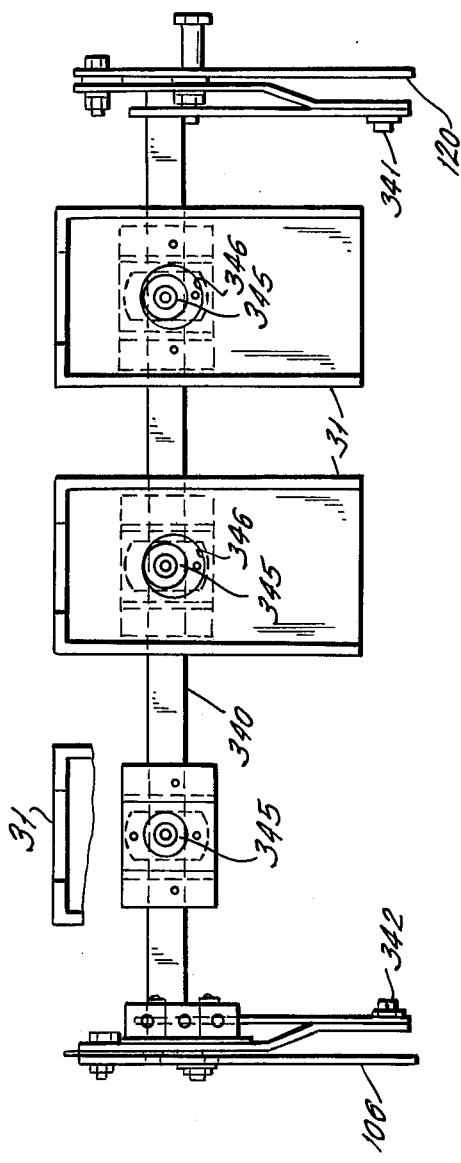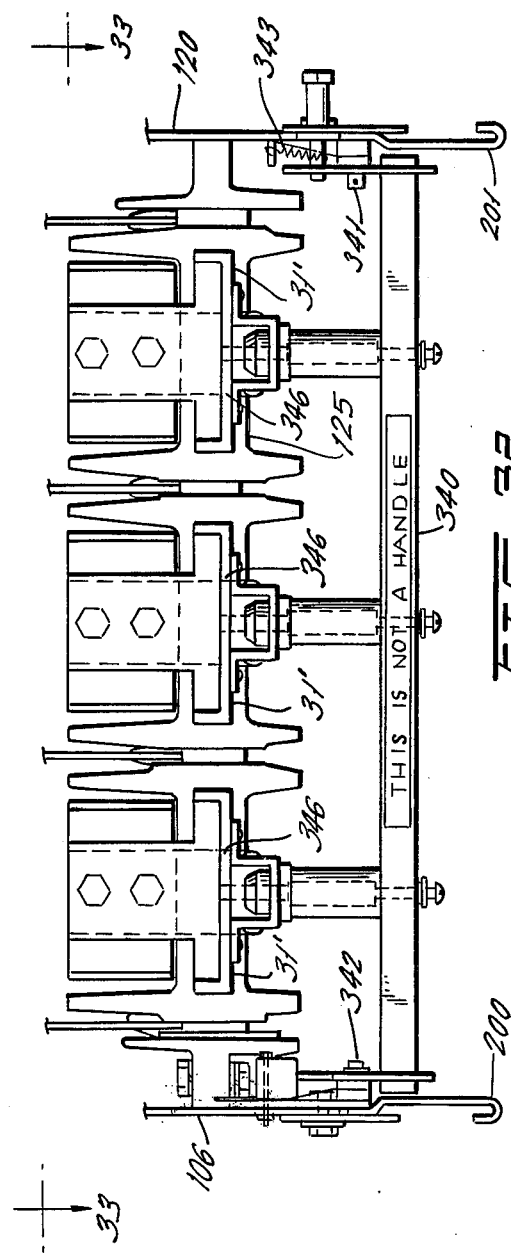

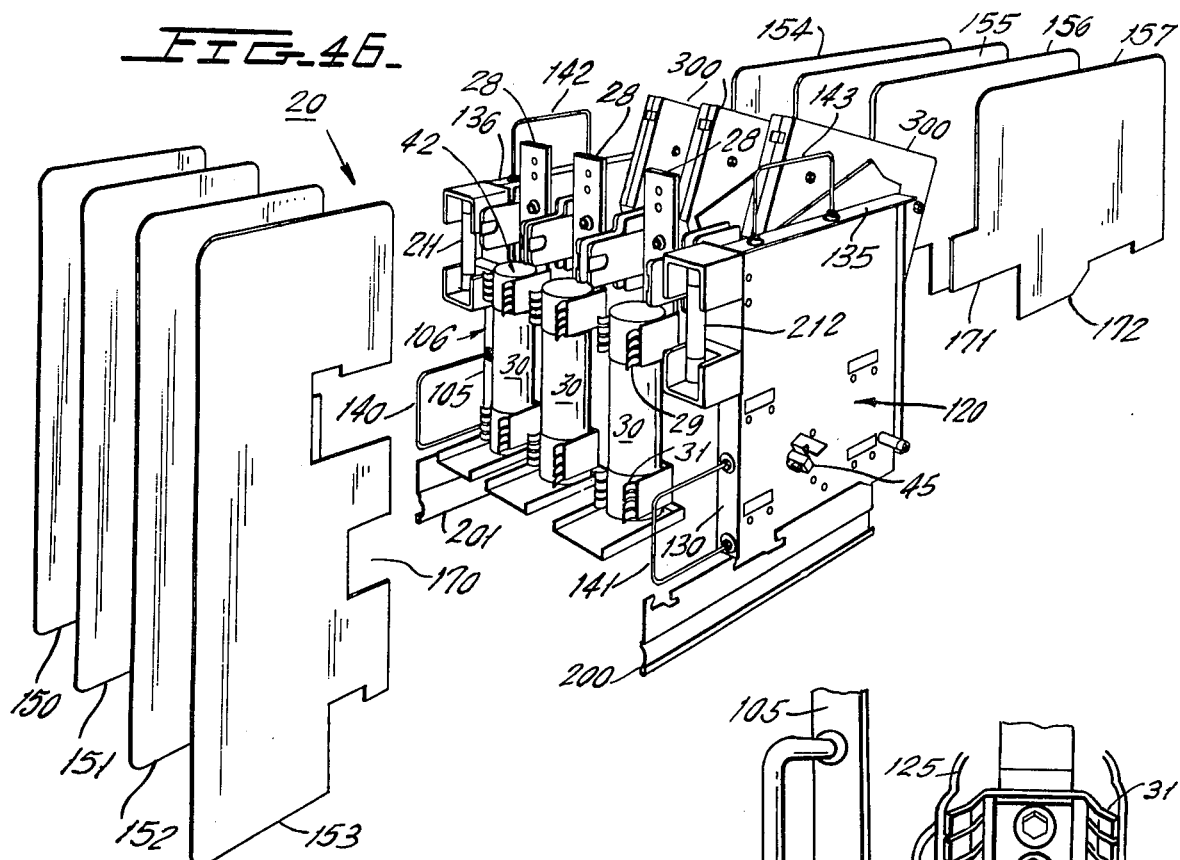
FIG. 46.
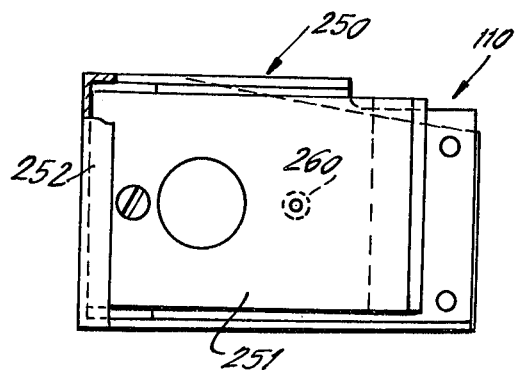
FIG. 34.
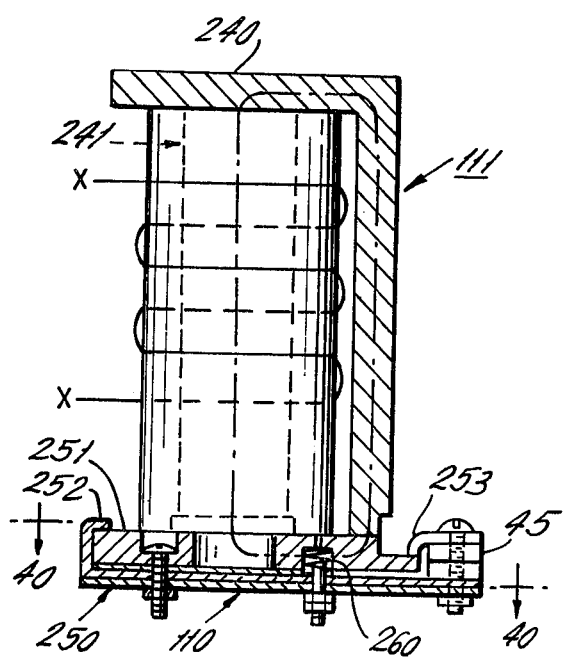
FIG. 39.
FIG. 40.

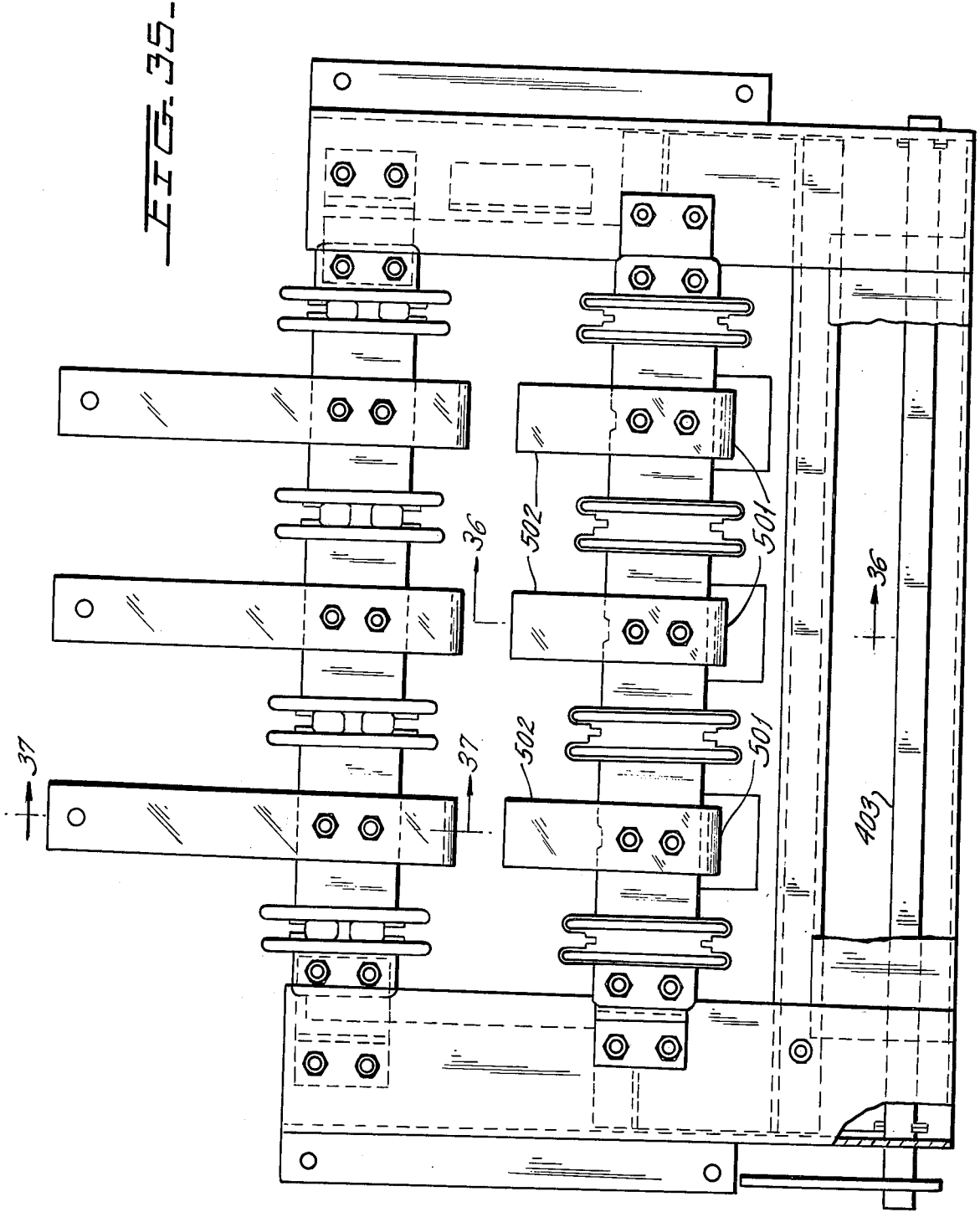

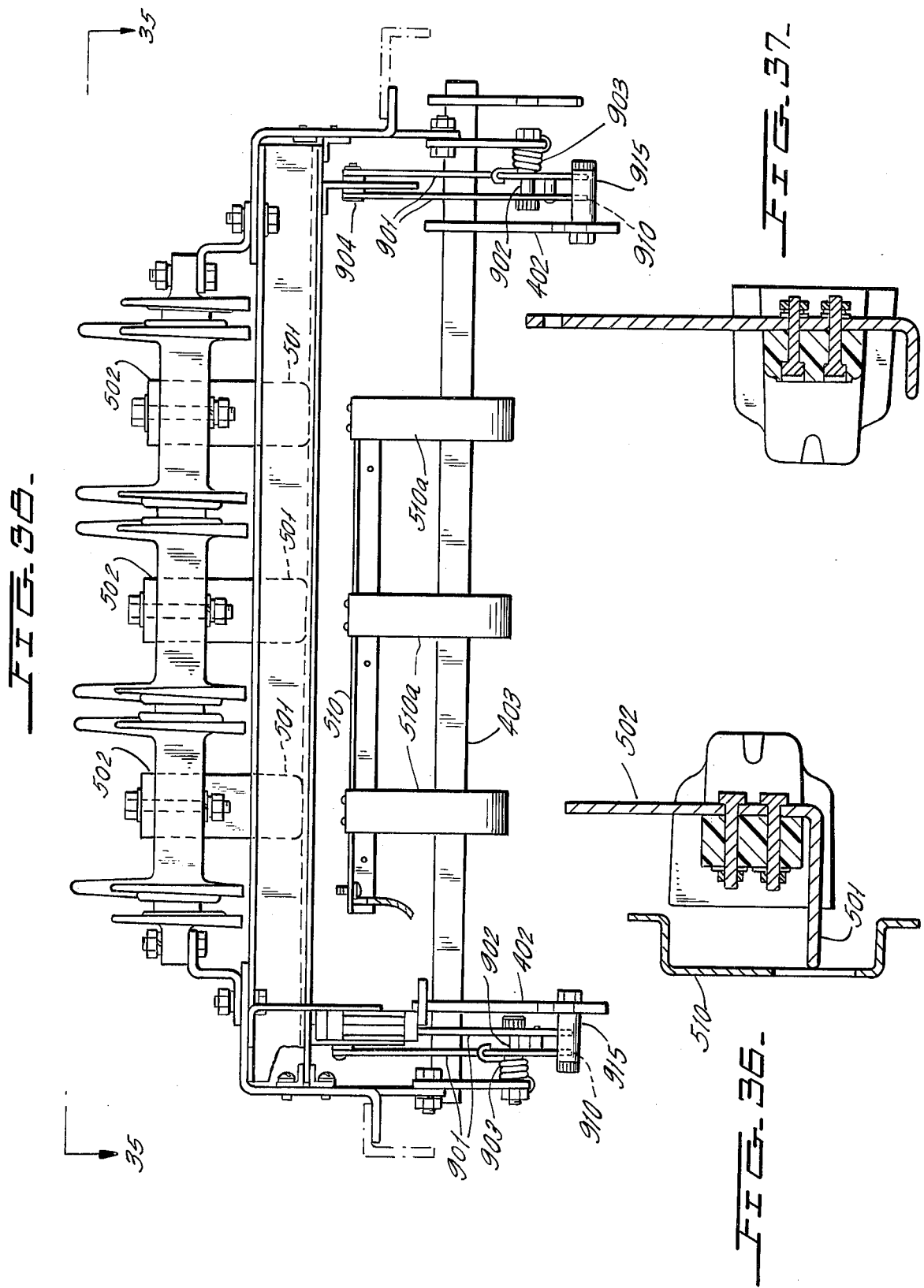

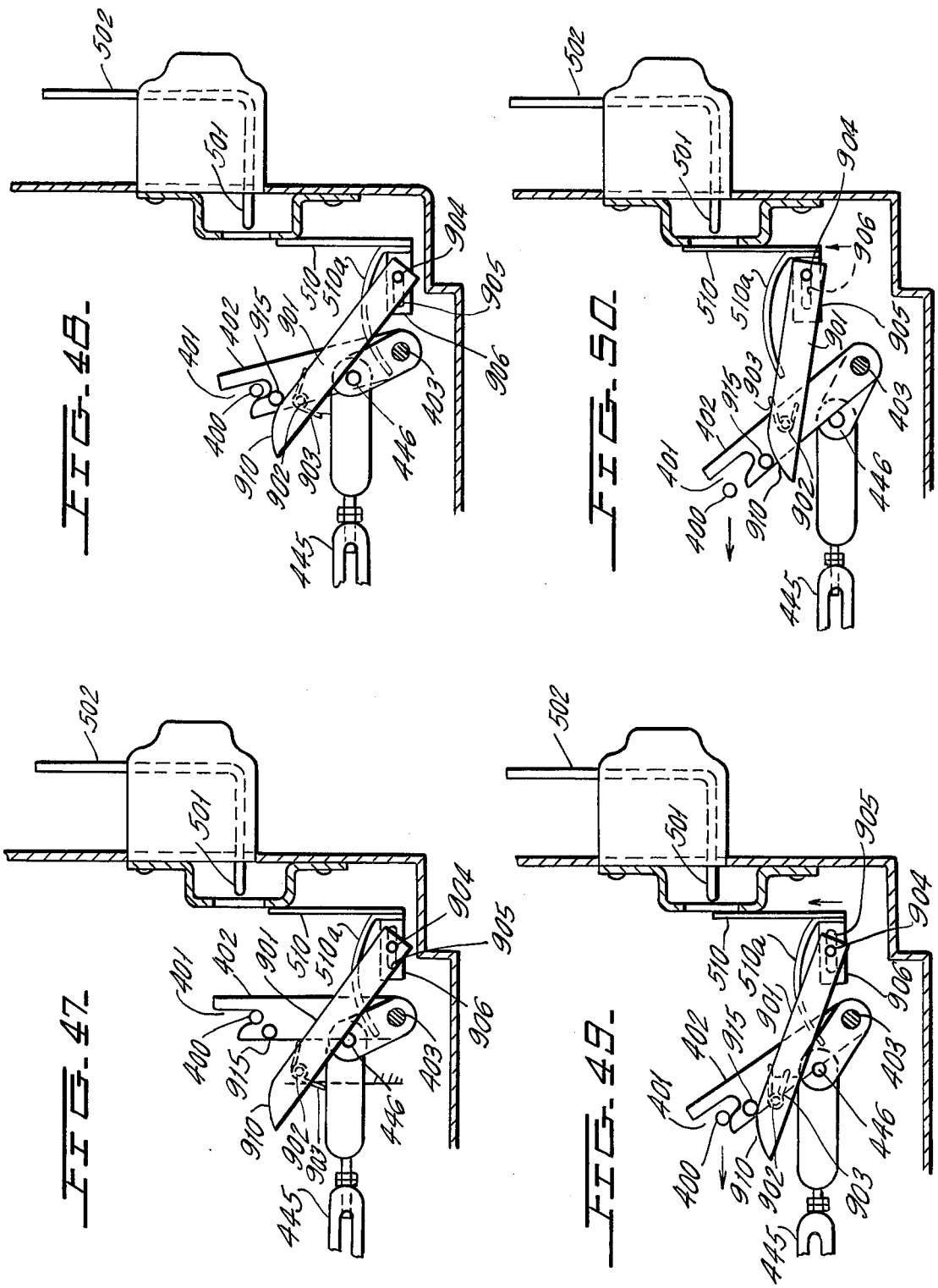

4,038,626

HIGH VOLTAGE CONTACTOR

The present invention relates to contactors, the operating elements thereof, the housing therefor and the means for inserting and removing the contactors. One of the essential elements of the present invention is the utilization of a modular construction for the contactors and the housings so that the housings may be arranged in multiple set-ups permitting a large variety of configurations for the contactor control center. Other essential elements are the structure of the contactor, the operation thereof, the arc-extinguishing structure, the anti-single phasing provision and the safety interlocks between the contactor and the housing.

BACKGROUND OF THE INVENTION

Contactors generally are devices which are arranged so that they may close a circuit when desired and will open the circuit, usually by manual control (and not automatically as in a circuit breaker), even though the currents are substantial load currents. The contactors may be of different sizes as required by the particular application to which they are directed. One of the primary elements of a contactor of the general type of the contactor which constitutes the present invention is that the control voltage and current for controlling the contactor may be taken from the line voltage through a transformer to a holding magnet which will hold the contacts closed. Should it be desired then to open the contactor it is necessary only to interrupt the current to the holding magnet and the contactor will open.

In control centers, it is customary to arrange the holding magnet and its armature so that it may be energized to operate the contactor through to the closing position. One of the problems which arises is that the energy which is required to move the contactor from open to closed position is much greater than the energy required to hold the contactor in the closed position. Hence the present invention contemplates the utilization of two coils so arranged that the operating coil which will move the armature from the open to the closed position is replaced electrically by a holding coil which will be brought into the circuit on the occurence of the closing. Thereafter the opening of the contactor may take place by opening the circuit to the holding coil.

The contactor is designed for high currents and substantial voltages such as 2200 to 4800 volts, 200 to 400 amperes at 60–50 cycles; the kind of motor to which such contactors would be applied are squirrel cage and wound rotor motors ranging up to 1500 horsepower to 2500 horsepower and synchronous motors ranging up to 1500 horsepower up to 3000 horsepower. The interrupting rating must then be of the order of 50 MVA. Consequently one of the essential requirements of a contactor of this type is the ability to interrupt the arc which is drawn when the contactor is opened under load. Various types of arc extinguishing devices have been utilized with respect to contactors, such arc extinguishing devices sometimes being integrated with the structure and sometimes readily removable for service and inspection of the contacts.

The present invention contemplates the utilization of an arc extinguisher having a combined arrangement of a sinesoidal arc path made up of interleaved or inter-finger insulating extensions transverse to the arc in order to lengthen the arc; and, in addition, at the top of the arc extinguisher, a plurality of closely adjacent, parallel spaced metallic plates extending transverse to the path of the arc.

In the utilization of such arc chutes it has frequently occurred that the blowout coil comprises a few turns of heavy copper in series with the circuit through the contactor. Where additional blowout energy is required, requiring many more turns than have previously been used, such additional turns would interpose an undesirable and unnecessary resistance in the current path, especially since the blowout coil would be effective and operate only during the act of interruption. Hence the present invention contemplates the utilization of an arc blowout coil so arranged that it is out of circuit when the contacts are closed but is brought into circuit by the arc itself when the contacts are opened so that any additional resistance or heat effects from the blowout coil during actual operation of the contactor in closed circuit position are thereby obviated. The outside of the arc chute has of course been provided with magnetic flux plates extending down into the area in which the arc is originally generated, that is the area adjacent the contacts. The blowout coil is adjacent the stationary contact; the flux generated by the blowout coil together with the half loop turn of the arc itself and the magnetic plates provide an upward thrust to the arc to drive it rapidly into the arc extinguisher.

Since contactors may be utilized in environments and applications requiring high currents and voltage and high load interruption capacity it had been customary to house contactors, especially those of the larger sizes, so that they might be isolated from adjacent contactors and for the protection of personnel.

One of the primary objects of the present invention is the formation of a modular housing construction so arranged that the various housings may be placed adjacent each other in such manner as to produce a control center in which all of the elements are highly accessible and in which all of the elements are so arranged that housing sections may be added and rearranged and contactors may be added to existing modular control centers.

In the present ivention the basic module dimension is of the order of 30 inches high, 36 inches deep and 29 inches wide. For smaller controllers each of the housings may thus be 30 inches high, 36 inches deep and 29 inches wide. For larger controllers each of the housings may be 45 inches high and have the same width and depth. Horizontal control sections may be arranged so that they are 15 inches high. Two 30 inch high cabinets may have two 15 inch control sections placed between them to produce a height of 90 inches equivalent to the height of a three-high controller. Side control sections may be arranged to provide an overall width of either 36 inches or 40 inches by the utilization of control sections which are 11 inches wide by 30 inch high and 36 inches deep or by the utilization of smaller control sections. In any event as above pointed out and as will be pointed out hereinafter the modular arrangement of the housings for the contactors and the housings for the control elements of the contactors is such that the control center may be arranged in any desired manner with a combination of various sizes of contactors and control sections to produce an easily operable control center in which all of the parts are readily locatable and in which add-on of additional parts or additional contactors is greatly simplified.

In the operation of contactors of contactors it is sometimes necessary or desirable not merely to open or close the contactor but also to remove the contactor, first to a test position in which the various physical operations of the contactor may be determined, as well as to move the contactor entirely from the housing. There are four basic positions: plugged in and ready to operate; unplugged and moved to a position where the door may open; partially moved out of the housing to a test position; and fully removed from the housing.

While it has been common in circuit breakers to provide various types of interlocks in order to protect the operator so that a circuit breaker may not be moved to a test position or to a full withdrawn position except under an open circuit condition and while some application of this concept has been made to contactors, —essentially the interlocks provided by the present invention are basic to the contactor itself rather than generic to a circuit interrupting device.

One of the problems which arises when the contactor is moved from a connected to a disconnect or test position and thereafter removed to a fully withdrawn position is that the connection to the busses is open and available so that the same may accidentally be engaged by a tool or an individual. The present invention contemplates that particularly the compartment stationary back disconnect contacts for the line side of the circuit will be protected by a shutter which moves into position immediately upon withdrawal of the contactor from a connected to a disconnect or test position. This may be applied to the load contacts as well. At the same time the shutter is so arranged that it contains grounding contacts which will provide a low resistance path to ground so that the contactor is thus neutralized and available for service and test.

As pointed out it is essential that the contactor be so arranged that it be interlocked both with the door of the housing and the housing itself so that the contactor cannot be moved from a connected position until the contacts are opened. The operating device which moves the contactor from a disconnect position into a fully connected position is so arranged that it cannot operate unless the door of the compartment is closed. When the contacts of the contactor are closed, a latch which must be removed to permit initiation of the withdrawal mechanism is locked against such movement. The contactor contacts must first be opened; then the latch may be moved out of the position where it blocks the withdrawal operation. The latch, however, is spring biased toward the position where it blocks the withdrawal handle operating mechanism; hence the latch must be held out of blocking position to permit the withdrawal handle to work. Thus, the withdrawal operation requires that two hands be used for the operation thereby ensuring that the operator will have placed his hands on the housing frame in a position where he cannot possibly touch anything else.

One of the problems which arises in the utilization of contactors especially those which are used with coordinated fuses in series with the contacts, is that should one of the fuses open in a three pase circuit, the contactor as a whole must immediately be fully opened to disconnect the other phases and to prevent the motor from single phasing. For this purpose a switch is provided in series with the holding magnet which is so arranged that, on the interruption of a circuit by operation of a fuse, a striker pin extending from the fuse will operate a tripper bar to operate the said switch to deenergize the holding magnet and thereby permit the contactor shaft carrying all the contacts to open immediately.

Since the open or closed condition of the contactor should be obvious from outside the housing, an "on-off" indicator is provided which is responsive to the position of the movable contact arm of the contactor.

Many of the primary objects of the present invention have also been set forth in the foregoing description of the background of this invention.

Many other objects and applications of the present invention will become apparent to those skilled in the art from the specific description herein contained in which:

FIG. 2 is a rear view of the contactor or controller of FIG. 1 in which the back disconnect contacts are visible.

FIG. 3 is a cross-sectional view taken on line 3—3 of FIG. 7 and constituting a longitudinal section taken through the contactor or controller of FIGS. 1 and 2 showing the novel contact arrangements, disconnect contact arrangement, the fuse holder arrangement, the blowout coil connection and the arc horn or runner arrangement.

FIG. 4 is a view taken from line 4—4 of FIG. 3 looking in the direction of the arrows and showing the lower fuse connector (see also FIG. 32).

FIG. 5 is a view taken from line 5—5 of FIG. 3 looking in the direction of the arrows and showing the blowout coil construction.

FIG. 6 is a front view in elevation of the novel contactor inserted in the housing showing in part the method of insertion thereof into the housing.

FIG. 7 is a view corresponding to that of FIG. 6 showing a front view of the contactor with the fuses removed.

FIG. 8 is a side view partly in schematic form taken from line 8—8 of FIG. 7 looking in the direction of the arrows.

FIG. 9 is an end view of the structure shown in FIG. 8 taken from the lefthand side thereof and showing another view of the closing and holding coil and its armature (see also FIGS. 39 and 40 for details of the closing coil and armature).

FIG. 9a is a view of a portion of the housing showing the closing and holding coils and their connection to the connectors (see also FIG. 14).

FIG. 10 is a side view of the contactor taken from line 10—10 of FIG. 7 looking in the direction of the arrows.

FIG. 10a is a detailed view of the rear edge of the contactor frame of FIG. 10.

FIG. 11 is a front view of the righthand portion of the contactor of FIGS. 1, 2, 7 and 10, taken from the left side of FIG. 10. (FIG. 11 corresponds to the right-hand portion of FIG. 1 and of FIG. 6).

FIG. 12 is a schematic showing the circuit through the contactor including the circuit through the blowout coil which is established from the stationary contact only after the arc has been drawn and begun to move up into the arc extinguisher.

FIG. 13 is a more complete wiring diagram showing the operating and control circuits of the contactor.

FIG. 14 is a view in perspective of one of the modular housing arrangements of the present invention showing a 90 inch high housing arranged for three contactors with one of the contactors shown removed and the control section arranged alongside.

FIG. 15 is a detailed view of the on-off indicator arm in the lower left corner of the open compartment at the center of FIG. 14.

FIG. 16 is a rear view of the compartment of FIG. 15 with the cover plate removed.

FIG. 17 is a view in perspective of the compartment with the contactor inserted therein but located in a withdrawn position and the handle operator down.

FIGS. 18a, 18b, 18c and 18d are top views of various forms of modular arrangements possible with the modular housing form of the present invention.

FIGS. 19a, 19b, 19c and 19d are respectively corresponding front elevations of the modular housing arrangement which forms one of the elements of the present invention and is described in connection with the compartment structures of FIGS. 14, 16 and 17.

FIG. 20 is a view in perspective taken from the front of one of the compartments of FIG. 14 with the contactor removed showing more particularly the left side of the interior thereof from the point of view of the viewer facing the same. As will be noted the operating handle is in the "on" position.

FIG. 21 is a view corresponding to that of FIG. 20 showing the interior of the compartment looking particularly to the right side thereof which is actually the major operating side thereof. Here, too, the operating handle is in the "on" or completely inserted position of the contactor and therefore it is clear that the shutte is down revealing the line disconnect stationary contacts. It should be noted that the shutter will move up to block access to the stationary disconnect contacts when the handle is moved to the "off" position.

FIG. 22 is a detailed view in perspective of the handle operating mechanism located on the right side of the housing of the compartment opposite the door hinge.

FIG. 23 is a side detail of the push rod interlock operation.

FIG. 24 is a view of the inside surface of the door frame carrying the contactor withdrawal handle operator of FIG. 22 (door closed).

FIG. 25 is a view corresponding to that of FIG. 24 showing the position of the members with the door open.

FIG. 26 is a side view taken from the right side of FIG. 20 of the interlock and operating mechanism of the compartment which interengages with the contactor and moves the contactor between a fully connected or disconnect position.

FIG. 27 is a plan view of the bottom of the compartment of FIG. 21.

FIG. 28 is a view partly in cross-section taken from line 28—28 of FIG. 27 looking in the direction of the arrows.

FIG. 29 is a fragmentary view of a portion of the latch mechanism in the compartment taken from line 29—29 of FIG. 27.

FIG. 30 is a side view of the lower portion of the left side of the compartment taken from line 30—30 of FIG. 27 looking in the direction of the arrows.

FIG. 31 is a cross-sectional view taken from line 31—31 of FIG. 28 looking in the direction of the arrows.

FIG. 32 is a front elevation of the lower portion of the contactor showing the fuse arrangement with the elements arranged to prevent single phasing when a particular fuse is open.

FIG. 33 is a view partly in cross-section taken from line 33—33 of FIG. 32 looking in the direction of the arrows.

FIG. 34 is a view in perspective of the left hand lower fuse clip of the contactor.

FIG. 35 is a rear view of a portion of the contactor constituting "the stab support rack assembly", taken from line 35—35 of FIG. 38.

FIG. 36 is a view partly in cross-section taken from lines 36—36 of FIG. 35 looking in the direction of the arrows.

FIG. 37 is a view partly in section taken from line 37—37 of FIG. 35 looking in the direction of the arrows.

FIG. 38 is a top view of the stab support assembly of the contactor.

FIG. 39 is a detailed view of the magnetic operating and holding coil assembly.

FIG. 40 is a detailed view of the armature of the magnet assembly of FIG. 39.

FIG. 41 is a side view of the arc extinguishing assembly of the contactor or controller.

FIG. 42 is a top view of the arc extinguishing assembly.

FIG. 43 is a front view of the arc extinguishing assembly.

Figure 44:
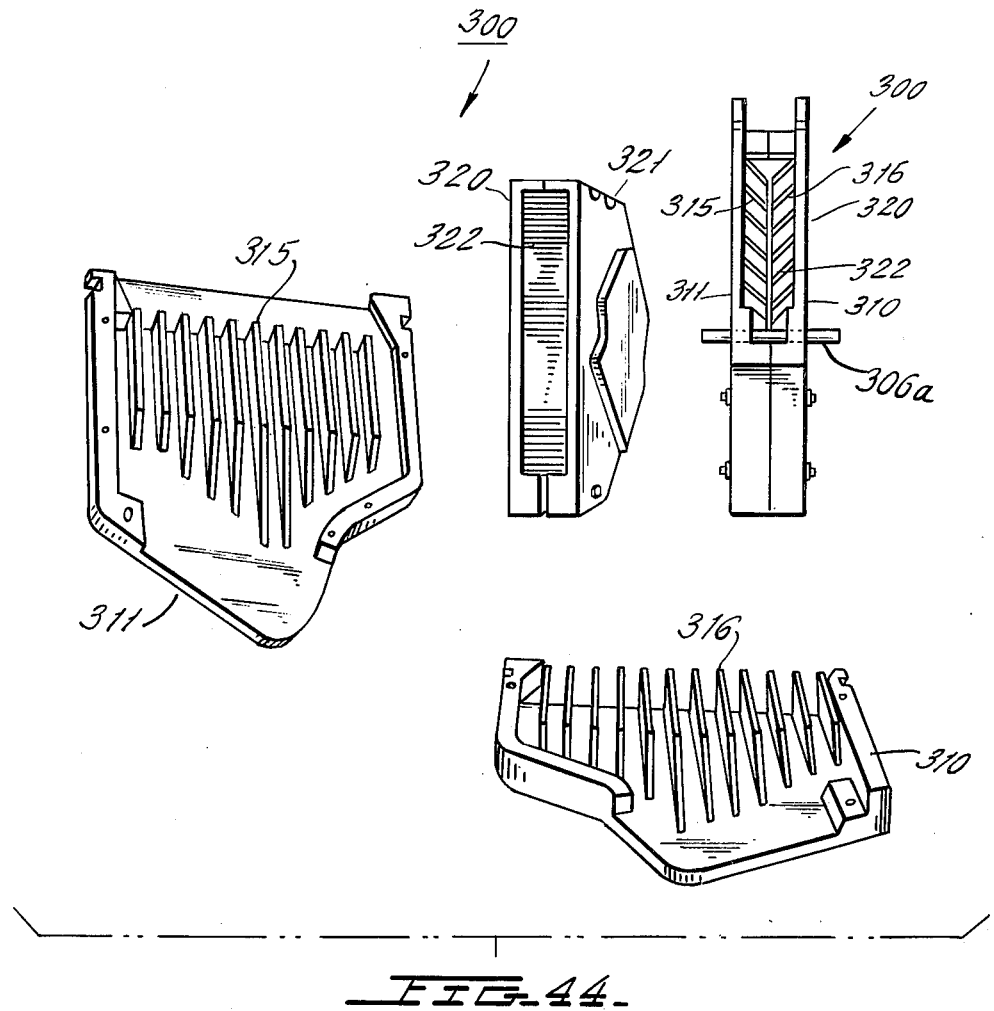

FIG. 44 is a view in perspective of two halves of the arc extinguishing assembly.

Figure 45:
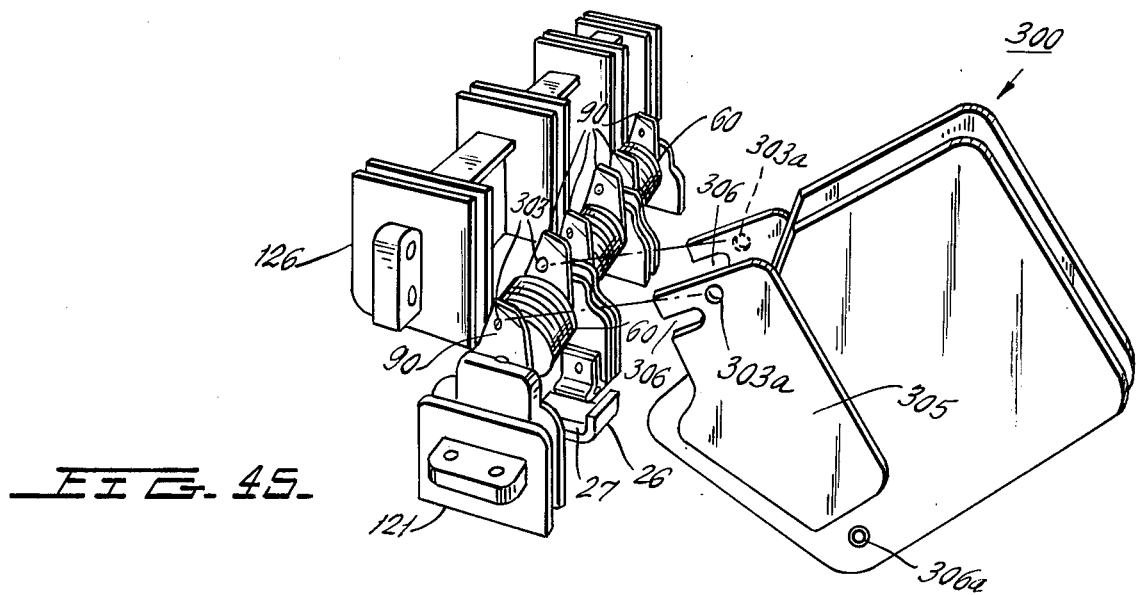

FIG. 45 is a view of a portion of the contactor showing one method of locating the arc chute.

Figure 1:
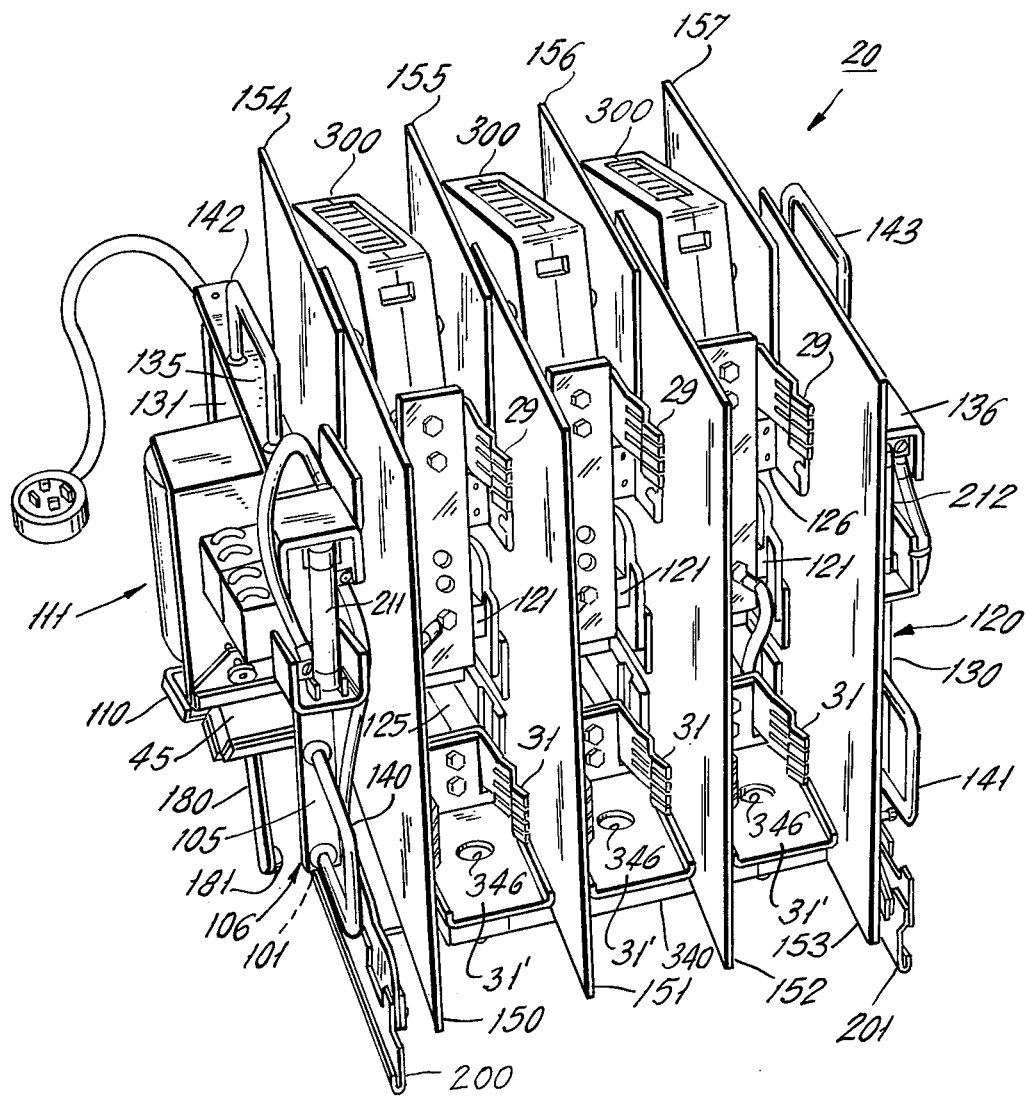
FIG. 1 is a front view in perspective of the novel controller or contactor with the main fuses removed and the arc extinguishers in place.

FIG. 46 is a view in perspective of the contactor corresponding substantially to the view of FIG. 1 showing the location and arrangement of interphase barriers.

FIG. 47 is a side schematic view showing the elements which operate the shutter for the line disconnect contacts in the cubicle with the shutter shown down and the stationary line disconnect contacts available.

FIGS. 48, 49 and 50 are views corresponding to that of FIG. 47 showing successive steps in the withdrawal of the contactor from the housing which simultaneously results in the raising of the shutter to block access to the stationary line disconnect contacts.

Referring first to FIGS. 1, 2, 3 and 46 the contactor 20 comprises a stab type of upper disconnect contact 21 which is secured to the rigid conductor 22. The rigid conductor 22 is connected by the flexible conductor 23 to the movable contact arm 24 carrying the movable contact 25. In the closed circuit position here illustrated the movable contact 25 engages the staionary contact 26 mounted on the rigid conductor 27 which in turn is integral with or may be connected to the rigid vertical conductor 28 which carries the upper fuse clips 29. Current may then pass from the upper fuse clips 29 through the fuses 30 (shown in FIG. 46) to the lower fuse clip 31, then to the rigid conductor 32 which is connected to or integral with the rigid conductor 33 at the end of which is mounted the lower disconnect or stab of disconnect contact 34.

The contact 21 is connected to the load and contact 34 is connected to the line. Consequently when the contactor is open, that is when the contacts 25 and 26 are separated, then the continuity of the circuit between the load disconnect 21 and the line disconnect 34 is broken; while, when the contacts 25 and 26 are engaged, there is a continuous circuit through the fuse 30 from the load disconnect contact 21 to the line disconnect contact 34.

Any overload which may require automatic operation of a circuit interrupter is taken care of by the fuse 30 which is selected to be of a sufficient size to protect against any anticipated overload condition. For a lower voltage rating, fuse clip 40 may be relocated to position 29 for a shorter fuse. Where overload protection is required which is not available with a fuse limited by the distance between the upper fuse clip 29 and the lower fuse clip 31, a pair of fuses arranged in parallel may be provided so that a greater overcurrent condition may be permitted; when either of the the fuse links within the parallel fuse links is broken, the other fuse link receiving the full overload will promptly break thereby ensuring interruption of the circuit. The anti-single phase structure (hereinafter described in connection with FIGS. 32–33) will still be operable even through such parallel fuses are used.

The moving contact arm 24 is pivotally mounted on the pivot 43 of the movable contact arm carrier 44. Movable contact arm carrier 44 is rigidly secured to the movable contact operating shaft 45. A contact pressure spring 46 is provided between the principal contact carrying arm 44 and the movable contact arm 24 to permit full travel of the contact shaft 45 and to ensure proper contact engagement.

The rigid conductor 22 carries a stationary arcing runner or horn 50 which will cooperate with the arc extinguishers hereinafter described. The arc runner or horn 51 of FIG. 3 is not an integral part of the contactor itself but is a part of the arc chute as hereinafter described. In other words when the arc chute is removed the arcing horn or runner 51 will be removed therewith while the arcing horn or runner 50 which is associated with the moving contact is rigidly and permanently secured to the contactor structure itself.

When the contactor is operated from the closed circuit position shown in FIG. 3 to the open circuit position shown by the dotted lines in FIG. 3 the arcing contact 45 moves beneath the end 53 of the arc plate or horn 50.

The arc which is drawn between the moving contact 25 and the stationary contact 26 actually constitutes a half turn loop between the magnetic plates (hereinafter described) of the arc extinguisher. This results in an upwardly directed magnetic force being impinged on the arc and the arc will jump from the moving contact 25 onto the arc horn or runner 50 which is of course in parallel therewith. At the same time the root of the arc on the stationary contact 26 will jump across the gap 55 between the arc horn 51 and the stationary contact 26 and will move up along this arc horn or runner 51 which is part of the arc chute itself.

It will be noted that the magnetic blowout coil 60 is arranged so that it is not in circuit when the contactor is closed; but one terminal of the blowout coil is connected by the lead 61 to the portion of the vertical conductor 28 of the contactor and the opposite terminal of the magnetic blowout coil 62 is connected to a conductive plate 63 which is electrically connected to the arc runner or horn 51 on the stationary contact side of the contactor. The magnetic blowout coil (also seen more readily in FIG. 5) is thus connected in circuit only when the arc is drawn and begins to move up the arc horns 51 and 50. At this time the magnetic blowout coil having been connected in circuit will provide substantial additional magnetic flux in addition to the half-turn coil formed by the arc to create a magnetic field across the magnetic plates, hereinafter described, of the arc extinguisher to drive the arc up into the arc chute where it may be stretched, attenuated, cooled and extinguished, also as hereinafter described.

As may be seen from the rear view of FIG. 2 the upper back disconnect contacts 21 constitute a pair of sets of upper fingers 70 and lower fingers 71 mounted on the conductor 22 in such manner that they may be moved toward each other. A bolt 72 passes through aligned openings in the fingers 70 and 71, the head 73 of the bolt bearing against the underside of the opening in the lower finger 71, the nut 75 at the upper end of the bolt 72 compressing a spring 76 between the said nut 75 and the upper surface of finger 70 thereby driving the fingers 70 and 71 resiliently toward each other. The cammed surfaces 78 and 79 of the fingers 70 and 71 respectively permit them to be inserted into and in effect "stabbed" into the back disconnect contacts described in connection with FIGS. 17 and 20.

The lower disconnect contacts 34 mounted at the end of the conductor 33 have the same structure and operation as the disconnect contacts 21 and the same reference numerals have been applied thereto with the addition of the letter *a* in order to indicate that the structure is the same.

While the individual contacts have been shown as two substantially single fingers 70 and 71 (see FIG. 2) a plurality of such fingers may be used with the bolt 72 extending between one pair of adjacent fingers and means being provided for bridging the fingers to drive them toward each other.

The lower disconnect line contact fingers 34 mounted on the rigid connector 33 are supported by the rigid connector 33 because it is supported on the structural insulating cross bar 80. While a great deal of the foregoing description has been directed to FIG. 3 it will be noted that FIGS. 1, 2 and 46 have also been referred to. The moving contact arcing horn 50 is clearly visible in the rear view of FIG. 2; the blowout coil 60 is also clearly visible therein. It will be noted that the blowout coil 60 is mounted between a pair of members 90, 91. These members are spring members with rivets 303 used as detents as hereinafter described in order to engage appropriate indents 303a in the magnetic side plates of the arc extinguisher so that the arc extinguisher will be removably retained in the desired position with the arcing horn or runner 51 of the arc extinguisher in engagement with conductor 63.

The contactor is normally biased toward the open position by the opening spring 101 which is attached to the flange member 102 secured to the contact shaft 45. The opposite end of the spring 101 is secured in any suitable manner to the flange 105 of the leftside frame member 106 (see also FIGS. 1 and 2). The contactor is operated to the closed position against the bias of the opening spring 101 by the armature 110 (see especially FIGS. 8 and 39) which cooperates with the operating magnet structure 111. The armature 110 is secured on an extension of the contact operating shaft 45.

The operating magnet is so arranged that a pickup winding 112 shown in FIG. 8 will lift the armature 110 and thereby rotate the contact carrying shaft 45 to the closed circuit position shown in FIG. 3. When the armature 110 is raised into the closed circuit position shown in FIG. 3 the armature 110 is of course rotated and an extension 114 of the armature drives the spring supported member 115 against a plunger 116 of the solenoid switch 117. Solenoid switch 117 which is shown in its actual location of FIG. 8 and also schematically at the left side of FIG. 8, when engaged by the operating element 115, opens a normally closed circuit by-pass current around the holding winding 118; since the parallel by-pass current is now open the holding winding is fully energized to hold the armature 110 in position.

Any interruption in the flow of current to the holding winding 118 will deenergize the holding winding 118 and will permit the armature 110 to be pulled down by the contactor opening spring 101 operating the shaft 45 in a counterclockwise direction with respect to both FIGS. 8 and 3.

The starting and holding circuits are also shown schematically in FIG. 13 as well as in FIG. 9a while the magnets are shown more clearly in FIG. 9.

The contactor unit as a whole comprises the side frame plate 106 on the left side (facing the front of the contactor FIG. 1) or on the right side (facing the rear of the contactor FIG. 2) and the opposite side plate 120. Between these side plates is mounted the supporting insulating bar 121 which supports the stationary contact and the blowout coil and the supporting insulating bar 122 (FIG. 3) which supports the rear disconnect contact structure including the contact carrying bar 22. The insulating cross piece 80 serves further to integrate the elements of the contactor while providing appropriate support for the back disconnect contact support structure 33; the front insulating cross piece 125 serves to provide appropriate support for the front of the structure and for the lower fuse contact structure 31. In addition the insulating support 126 serves to support the upper fuse contact support structure 28 and the fuse clip 29 and/or 40. These insulating members 121, 122, 80, 125 and 126 are carried between side plates 106 and 120 and integrate the entire structure.

Each of the side plates 106 and 120 is provided with the front flange 105 for the side plate 106 and the front flange 130 for the side plate 120. In addition each of the side plates is provided with a rear flange 131 for the side plate 106 and 132 for the side plate 120. Additional flanges may also be provided for the side plates including the upper flange 135 for the side plate 106 and the upper flange 136 for the side plate 120.

As previously pointed out the flange 105 for the side plate 106 serves as a point of securement for the end of the opening spring 101 of FIG. 2 opposite the end thereof which is attached to the contactor shaft to bias the same toward the open position. In addition the front side flanges 105 and 130 carry pull out handles 140 and 141 respectively which may be utilized by the operator to draw the opened contactor out of the cell or cubicle as shown in FIG. 1. The upper flanges 135 and 136 may also be provided with handles 142 and 143 so that the contactor may readily be lifted up by hand or by an appropriate hoisting device when the contactor is removed from the cubicle (see FIG. 14).

As will also be seen from FIGS. 6, 7, 8, 9 and 10 as well as Figures already thus far described (FIGS. 1, 2, 3, 4 and 46) the contactor is provided with interphase barriers 150, 151, 152, 153 which interengage with and overlap the interphase barriers 154, 155, 156, 157 at the rear. The interphase barriers are readily removable by being pulled out forwardly (barriers 150-153) and pulled out rearwardly (barriers 154-157) and as seen especially in FIG. 2 overlap each other when they are inserted in place. The contactor itself is provided with interphase separators 160 (FIG. 3) located on the shaft 45 between each of the contact elements; the recesses 170 in each of the front interphase barriers 153 may move alongside the discs 160 and thereby complete the interphase barrier arrangements at the contact shaft. The lower forward edge portion 171 of each of the rear interphase barriers 154-157 essentially rest on the insulator 132 and provide further interphase protection at the contacts, overlapping with the forward interphase barriers; and the dependent section 172 of each of the rear interphase barrier plates 154-157 provide interphase protection with respect to the rear disconnect contacts especially the line disconnect contact 21 and the conductors 22.

As seen particularly in FIGS. 1, 7 and 10 the shaft 45 which carries the moving contact elements 25 of the contactor also carries (in addition to the magnet armature 110 of FIG. 8) the indicator operator bar 180 and the roller 181 at the lower end thereof to cooperate with the on-off indicator bar shown in FIGS. 15 and 20. The lower end of the contactor (see FIGS. 7 and 10) is provided with the rail 200 carried by the left side frame plate 106 and the rail 201 carried by the right side frame plate 120 which rails cooperate with wheels in (FIG. 7) the cubicle.

In FIG. 12 the basic operating circuit for the contactor is shown. The load disconnect contact 34 and the line disconnect contact 21 are so arranged that they are in circuit with the contacts 25 and 26 of the contactor as well as the fuse 30. The blowout coil 60 for the arc extinguishing device is out of circuit during normal operation and, as previously described, only when the arc is blown up into the arc chute is the blowout coil 60 connected in circuit, being then connected in parallel with the stationary contact 26. The circuit of FIG. 12 is shown more schematically in FIG. 13 at the upper part thereof in which the load disconnect contacts 34 are each connected through the fuse 30 to the contacts 25, 26 of the contactor and then through the line disconnect contacts 21 to the load designated by the letter M and the three phase coil arrangement. Current for the control circuit is taken through the transformer 210 mounted in the cubicle and connected thereto through the fuses 211, 212 on the contactor (see for instance FIG. 46). The connections for the transformer are drawn from the two outer phases of the contactor structure being then connected by stationary disconnect contacts 233, 234 in the cubicle (FIG. 20) and appropriate contacts 230 and 231 of the contactor. The transformer 214 is mounted in the cubicle as hereinafter described and the control circuit elements are particularly described in connection with their particular function and the particular figures. It is sufficient however to point out here that the operating magnet structure 111 and particularly the holding magnet 118 circuit may be broken by the opening of the contact 216. The contact 216 is provided to prevent single phasing; in other words, as hereinafter described, when any fuse interrupts the current a plunger thereon will operate a tripper bar to operate the contacts 216 and thereby opening the circuit to the holding coil 118 and thereby ensure that the contactor as a whole is open. Section 220 of the control circuit is also mounted on the contactor being connected into the control circuit by the contacts 221, 221a, 222, 223, 224 while the section 225 of the control circuit is stationarily mounted in the cubicle including the transformer 214. The entire control circuit is connected when the contactor is inserted into the compartment by the contacts 230, 231 on the contactor which engages respectively the stationary contacts, 233 and 234 (FIG. 20) at the rear of the cubicle into which the contactor is inserted.

The general structure of the operating magnet 111 and its armature 110 is shown generally in FIG. 8 as well as in FIG. 1 and FIG. 6 and FIG. 9. The specific structure is more clearly shown in FIGS. 39 and 40. A steel enclosure 240 is provided for housing the cylindrical structure 241 of the magnet. This cylindrical structure 241 may be an appropriately encapsulated coil as seen in FIG. 9 with the appropriate connectors 242, 243, 244 arranged therein in order to provide appropriate circuit connections for the holding winding 118 and the pickup winding 245. The coils encapsulated in cylinder 241 of the magnetic structure 111 are supported as a unit by the steel frame 240, which is mounted on the leftside plate 106. The armature 110 is carried by an extension as previously pointed out of the shaft 45 which carries the contacts. The armature 110 comprises a stainless steel framework 250 within which is supported the magnetizable armature structure 251 the said structure being held for limited movement or play at one end by the flange 252 of base 250 and at the other end by the flange 253 which is spaced relatively closely to the base 250 of the armature 110 in order to provide a hinge section; thus, the armature is not gripped tightly by the flange 253 but is sufficiently held therein so that it may pivot without falling out. A spring 260 is provided between the base 250 and the magnetizable section 251 in order to permit the armature to seat itself properly against the magnet when pickup winding is energized and when the holding winding 118 is thereafter energized.

The operation of the contactor to prevent singlephasing has been referred to. In order to achieve this operation an anti-single-phasing bar 340 is provided connected at each end to the support arm 341, 342 and maintained in the position shown in FIGS. 32 and 33 by the tension spring 343 which tension spring may be duplicated on the opposite side, said spring being connected between the frame and the arm 341 (or 342 or both) to maintain the tripper bar 340 in position. When any of the fuses 90 mounted in the structure trips, a plunger 345 will pass through the opening 346 in the lower fuse support clip 31 and will rotate the tripper bar 340 downwardly. This will then operate the anti-phasing switch 216 of FIG. 13 (see also FIGS. 32 and 33).

The arc extinguishers 300 are shown in position in FIGS. 1 and 6. The rotation of the arc extinguishers 300 toward the rear after the contactor has been removed from the cubicle in order to release the arc extinguishers 300 from the contactor is shown in FIG. 2.

The structure of the individual arc extinguishers is seen in FIGS. 41–45. In FIGS. 2, 3 and 45 it will be seen that the blowout coil 60 is provided with an extension 302 on each side and is seated on a base 63 from which extend the lateral supports 90, 90 for the arc chutes. These support members 90 are essentially of spring material biased toward each other and are provided with raised buttons 303 on each side in order to engage indents 303a of the exterior of the arc extinguisher and hold it in place. The magnetic side plates 305 on each side of the arc extinguisher each has a recess 306 which engages the extensions 302 on each side of the blowout coil 60 and provide support for the front of the arc chute as well as integrating the arc chute with the blowout coil. The arc chute may be swung out around the supporters 302 (as seen in the middle arc chute of FIG. 2) to be removed. The rear of the contactor has an insulating pin on the upward extension of support member 122 (Section 3) which engages slot 306a (FIGS. 2 and 3) on an extension 306c of the arc chute. Also as seen in FIG. 3 the arc extinguisher carries a front arc runner 51 which is part of the arc extinguisher and supported between the side plates thereof as hereinafter described. Rear arc horn 50 is part of the contactor structure being actually physically connected and mounted on the support 22 for the load disconnect 21.

The arc extinguisher 300 comprises a pair of plates 310, 311 (see FIG. 44) each of insulating material. Each of the parallel plates 310, 311 is provided with a plurality of individual plates 315 (for the main plate 311) and 316 (for the main plate 310) which plates may interfinger parallel to each other as shown in FIG. 42. Above the insulating arc chute structure there is also provided the frame 320 carrying spaced parallel metallic plates 321 which extend transversely of the arc. The contactor is so designed that the arc will be fully extinguished in the lower section of the arc chute consisting of the interfingered plates 315,316 which will lengthen, atenuate and squeeze the arc as well as cool it thereby extinguishing it. The upper metal plates 321 will serve to cool gases which are expelled. In the remote possibility that any of the arc itself will reach the spaced parallel metal plates, they will, by the blowout action, be moved rapidly into the plates and will be broken up into a plurality of arcs in series, the roots of which will be cooled and the extinguishment of any of the series arcs will result in complete extinguishment of the arc. As previously pointed out the design is such that this type of operation is not intended to occur but is present to cool the gases and as a backup for the main arc extinguisher.

The magnetic plates 305 on the exterior of the main side plates 310,311 extend into the area of the blowout coil 60 and up to the upper end of the arc chute to provide a strong magnetic flux to move the arc into and through the arc chute. The lower rear end of the contactor (see for instance FIG. 2) is provided on each side at the lower rear corner with an extension 400 extending on one side from the frame 106 and on the other side from the frame 120.

When the contactor is inserted into the compartment and compartment elements are in the position shown by the solid lines of FIG. 26 and the extension 400 from each side of the contactor engage into the slot 401 of the crank arm 402 on each end of the rotatably mounted shaft 403. When the shaft 403 is rotated in a clockwise direction with respect to FIG. 26 the extension 400 on each side of the contactor will be pulled clockwise with respect to FIG. 26 and the contactor will be pulled from a withdrawn position into a connected position in which the back disconnect contacts 21 and 34 on the contactor will engage the stationary disconnect contacts 21 and 34 in the compartment leading to the busses.

The compartment, as will be readily seen from FIGS. 17, 20 and 21 comprises a rear wall 410, a left side wall 411, a right side wall 412 and a door 413. In FIG. 17 the contactor is shown in withdrawn position in which the back disconnect contacts are disengaged. The floor 415 of the compartment simply provides a convenient bottom wall for the compartment. The contactor is actually supported when it is inserted into the compartment on the rollers 420a, 420a on each side which engaged with the rails 200, 201 (FIG. 1) so that the contactor may readily be slid into position. It will be noted that wheels and wheel mountings are more readily deformable than a simple rail. Since the wheels and the wheel mountings are to remain in the compartment and only the rails on the contactor are removed with the contactor the possibility of deformation of the sliding structure is greatly reduced.

The front frame 420 of the compartment (see FIGS. 17 and 21) at the wall 412 is provided with a handle 422 pivotally mounted on a shaft 423 held by the bracket 424. It will be noted that the bracket 424 is provided with the slot 425 into which a padlock or other holding device may be inserted to prevent unauthorized rotation of the handle. The shaft 423 which is secured to and rotated by the handle 422 carries the pinion 430 which operates the rack 431 which in turn operates the vertical slide bar 432. The lower end of the bar 432 is connected by the pin 435 which rides in slotted extension 437 of the bar 432 connected to the bell crank lever 438. Bellcrank lever 438 is essentially a triangular member pivotally mounted on the side wall 412 by the pin 440 and held in place thereon by the cotter pin 441. Therefore, when the bar 432 is moved downwardly it rotates the triangular bell crank lever 438 downwardly and thereby causes the pin 442 to move to the left with respect to FIG. 21 thus driving link 443 to the left. The length of the link 443 may be adjusted by the turn-buckle 445. The link 443 is connected at its opposite end by pin 446 to the crank arm 402. When the link 443 is thus pushed to the left the crank arms 402 are rotated in counterclockwise direction or in a direction to move the contactor bar extensions 400 and hence the entire contactor along the rollers 420a and into engagement with the stationary back disconnect contacts.

The bar 432 is provided with the vertical slot 450 through which extends the push rod 451 connected to the external red button 452. The push rod 451 is biased toward an outward direction by the compression spring 453 carried between a flange on the push rod 451 and the bracket 455. The bar 432 which is operated by the rack and pinion 430, 431 as seen in FIG. 24 is provided with the detent 460; latch member 461 engages the detent 460 of the bar 432 which, as previously noted, is operated by the handle 422 when the contactor is in the fully inserted position and the door is closed. In order to move the bar 432 upwardly and thereby rotate the bell crank lever 438 in a counterclockwise direction to pull the link 443 toward the door and thus to rotate the crank arm 402 in a clockwise direction to pull the contactor out of engagement with the stationary disconnect contacts, it is necessary first to release the latch 461 from the detent 460; otherwise the handle 422 will not be able to operate to raise the operating bar 432. To accomplish this function, the red button 452 on the push rod 451 must be pushed in by one hand to move the latch 461 inwardly to the dotted line position shown in FIG. 22. At this time and while the button 452 is held in by one hand, the other hand may then move the handle 422 from the "on" position shown in FIG. 21 to the "off" position shown in FIG. 26.

When the contacts of the contactor are closed, the extension 468 of push rod 457 will abut arm 469 (FIG. 14) of the contact shaft and the movement inward of push rod 457 is blocked. The handle 422 thus cannot be freed to move while the contacts of the contactor are closed.

The bell crank lever 438 which is shown as a triangular piece, is provided also with the pin 470 connected to the link 480 which passes through an opening 481 in a flange 482 of the inside frame member 490. A compression spring 491 is captured between the flange 482 and a collar 492 on the link 480 hinged on the pin 470 and provides an overcenter operation. Therefor, when the bell crank lever attains a position where the pin 470 is in front of a line from pin 442 to the lip of spring 491, the spring 491 will drive the pin 442 toward the left or rear of the cubicle and drive the bell crank lever 438 toward the inserted position of the contactor. When the device has been operated so that the pin 470 is to the rear of said line, then the spring will drive the contactor toward a withdrawn position. This will assist the operator both in completing the withdrawal and completing the insertion of the contactor.

As the contactor is withdrawn so that the line disconnect contacts 34 are withdrawn from the stationary disconnect contacts 501 at the end of the line bus 502, it is desirable that the compartment and the operator be protected by removing the possibility of access to the stationary line disconnect contacts 501. For this purpose a shutter 510 is provided which is connected in such manner that it will be lowered to provide access to the stationary line disconnect contacts 501 just as the contactor is moved into a position as the line disconnect contacts 34 on the contactor are driven in.

The members 510a on the shutter 510 serve as grounding members for the contactor when it is in the disconnect position and still in the cubicle. Members 510a then engage the back disconnect contacts of the contactor.

Referring back to FIGS. 17, 18a–d, 19a–c, it will be seen that the modular arrangement previously described is available for various sizes of contactors. While the modulus has previously been described in terms of fractions of an inch it will be noted in FIGS. 18d and 19d that the modular arrangement using one third of the height of the stack for each compartment provides a plurality of compartments 600, 601, 602 for relatively smaller contactors. Looking at FIG. 19c it will be noted that with the same height stack the compartments 603 and 604 having 1½ times the height of each of the compartments 600 to 602 will each receive a larger contactor. Going to FIG. 19d it will be seen that compartments 600a and 602a will have the same height as compartments 600, 602 of the stack 19d but control compartments 613 and 614 which have half the height of each of the compartments 600, 601 and/or 602 may be placed between the compartments 600a and 602a in order to obtain the uniform height. In the stacks of 19b, 19c, 19d various types of control compartments have been shown, these control compartments having been identified by the reference numbers 620, 621, 622 for the smaller control compartments and reference numbers 623, 624 for the larger control compartments. These, where needed, will furnish additional controls, as may be seen in the stack of 19a such control compartments, even when removed, will nevertheless make it possible to have a stack 600b, 601b and 602b the same height as the stack of FIG. 19d. All of the compartments are of modular construction; control compartments and contactor compartments are so arranged that they represent either a complete module or an exact half-module or 1½ times module; therefor a uniform control center may be created as shown in FIG. 14.

FIG. 16 shows a rear view in which the line busses 700, 701, 702 may be connected into the rear of the compartment and then connected by appropriate straps 710, 711, 712 to the appropriate line disconnect contacts and appropriate connectors may be provided for the stationary line disconnect contacts.

The left side of the contactor as previously described is provided with the handle 180 extending from the contact carrying shaft 45 terminating in the roller 181. The compartment is provided (see FIGS. 14, 15 and 20) with a lever 800 stationarily pivoted at 801 adjacent the left side wall 411 of the compartment. The front of the lever is provided with on-off indicia. The "on" indicator is located at its lower end and the "off" indicator at its upper end. These are visible through the openings 805 in the door 413 of FIG. 17. When the contactor is open the movable contact shaft 45 is rotated to a position where the lever 180 is rotated counterclockwise with respect to FIG. 15 thereby pushing down the end 802 of the lever and raising the end 803. The front of the lever 800 forward of its pivot 801 is heavier than the rear; and lever 800 is thus biased toward an "off" indication.

As seen in FIG. 17 the door is provided with latch operator 810 and 810a and 810a section 420 of the frame is provided with elements responsive to the latches (see FIGS. 22 and 25). When the door 413 is closed the upper surface of the latch 810 engages the lever 811 which provides a detent 812 engaging the pin 815 which in turn is secured to the operating bar 432. When the door surface 810 engages the surface 820 of the latch it rotates the lever 811 so that the detent 812 is removed from the pin 815 and now the handle may be operated toward the "closed" or fully inserted position of the contactor.

The latch operating surface 810a of the door (FIG. 17) provides a detent for latch 830 to lock the door when the handle 422 is in the "on" position and the elements are in the position of FIG. 24. The pin 815 has driven extension 840 of lever 830 clockwise to lock the door against the bias of a spring (not shown) which tends to drive lever 830 counterclockwise. When the handle is moved to the "off" position (FIG. 25) the pin 815 no longer drives the latch 830 to door locking position and the door may be opened.

In FIGS. 47, 48, 49 and 50 successive steps have been shown for the operation of the shutter 510 to block the stationary or bus line disconnect contacts 501 as the contactor is removed. It will be recalled that the operation of shaft 403 to rotate the crank arm 402 in a counterclockwise direction results in the slot 401 of the crank arm 402 pushing on the extension 400 of the contactor to move the contactor toward the door. The shutter 510 is supported by the lever 901 which is pivotally mounted on the pin 902 located on the right side wall of the housing. Spring 903 biases the lever 901 to rotate in a clockwise direction thereby driving the pin 904 of the lever 901 downwardly. The pin 904 is engaged in slot 905 of extension 906 of the shutter 510 and thus drives the shutter 510 downwardly. A similar arm or lever 901 may be used on the left side wall simply to support the shutter and the operating mechanism may be duplicated on that side if required. The support lever 901 is provided with the cammed surface 910 to the left of the pin 902 (with respect to FIGS. 47-50) and thus toward the front of the housing. A pin 915 extending from the crank arm 402 engages the cammed surface 910 as the contactor is withdrawn from the housing (to the left with respect to FIGS. 47-50); and, as seen particularly in FIGS. 49 and 50, rotates the lever 901 counterclockwise to raise the shutter 510 to the contact blocking position of FIG. 50. At this time the grounding extensions 510a of the shutter 510 engage the lower back disconnect contacts of the contactor in order to provide a ground connection therefor. When the contactor is racked in, the reverse operation occurs as the contactor is inserted into the housing structures with the elements of the shutter operator in the position of FIG. 50; the extension 400 from the housing engages in the slot 401 of the crank arm 402; and as the contactor is racked in, the shutter is operated from the position shown in FIG. 50 back to the position shown in FIG. 47.

In the foregoing the present invention has been described in connection with illustrative embodiments thereof. Since many variations and modifications will now be obvious to those skilled in the art, it is preferred that the scope of the invention be determined not by the specific disclosures herein contained but only by the appended claims.

The embodiments of the invention in which an exclusive privilege or property is claimed are defined as follows:

1. A contactor comprising a stationary contact and a movable contact; the movable contact being operable into engagement with said stationary contact and out of engagement therewith to open a circuit through said contacts;
   a control circuit for said contactor comprising an electromagnet and an armature;
   means for energizing said electromagnet to move said armature toward said electromagnet;
   a mechanical connection between said armature and said movable contact;
   said movable contact being driven into engagement with said stationary contact when said armature is drawn to said electromagnet;
   additional electromagnetic means for retaining said armature in a position in which said movable contact is engaged with said stationary contact;
   biasing means driving said movable contact away from said stationary contact;
   and means for opening the circuit to said additional electromagnetic means thereby releasing said armature and permitting said biasing means to move said movable contact away from said stationary contact.

2. The contactor of claim 1 and a housing therefor; said contactor having a load disconnect contact member connected to one of said stationary and movable contacts and a line disconnect member connected to the other of said stationary and movable contacts;
   said disconnect contacts on the contactor extending rearwardly of said contactor;
   said housing having a rear wall, side walls, and a front door;
   the rear wall of said housing carrying stationary disconnect contacts positioned to cooperate with the corresponding disconnect contacts on said contactor;
   said contactor being insertible into said housing and movable therein until the said disconnect contacts on the contactor engage the corresponding stationary disconnect contacts at the rear wall of said housing.

3. The contactor and the housing therefor of claim 2 in which the contactor is provided with additional rearwardly directed control circuit disconnect contacts; and the housing is provided with additional corresponding stationary control circuit disconnect contacts; said additional control circuit disconnect contacts on said contact and said housing disconnect contacts being engaged when the contactor is inserted in the housing;

said control circuit being completed when said additional control circuit disconnect contacts are engaged.

4. The contactor and housing of claim 3 in which the contactor carries a part of said control circuit and the housing carries a part of said control circuit;

a transformer carries by said housing having a primary winding in parallel with the stationary load disconnect contacts of said housing and a secondary winding connected to the additional control circuit disconnect contacts of said housing; said control circuit including means for closing the control circuit and multiple additional means in series for opening said control circuit;

the said means for closing the control circuit being located at the front of the housing and one of said multiple additional means in series for opening said control circuit being located at the front of the housing.

5. The contactor of claim 1 wherein a plurality of stationary and movable contacts are provided;

a moving contact operating shaft; said movable contacts being mounted on said operating shaft; said armature being connected to said shaft; and biasing means being connected to said shaft to drive said shaft in a direction opposite to that in which it is driven by said armature.

6. The contactor of claim 5 having a blow-out coil and the arc extinguisher for each set of stationary and movable contacts;

said contactor having a stationary arc runner connected in parallel with each moving contact; and an additional arc runner mounted in said arc extinguisher;

said additional arc runner being connectable to said blow-out coil at one end of said blow-out coil, the other end of said blow-out coil being connected in parallel with said stationary contact; a gap between said additional arc runner and said stationary contact; said blow-out coil being disconnected by said gap during operation of said contactor is closed circuit position; the arc drawn between said stationary and movable contacts when the contactor is opened under load bridging said gap and rising on said arc runner; said blow-out coil being brought into circuit by said arc when the arc engages said stationary arc runner.

7. The contactor of claim 6 having arc extinguisher supports on said contactor extending from said blow-out coil for rotatably engaging a portion of said arc extinguisher at the front of the contactor; and an additional support for the rear of the said arc extinguisher; said additional arc runner being connected in circuit with said blow-out coil when the arc extinguisher is mounted on the contactor; said arc extinguisher being rotatable forwardly to release the same from the contactor and to permit inspection of the contactor contacts.

8. The contactor of claim 7 in which the arc extinguisher is provided with a pair of side walls of insulating material extending parallel to the path of movement of the movable contact; a plurality of insulating extensions from said side walls; said extensions being interfingered to provide a tortuous path for the arc as it is moved up into the arc extinguisher;

a pair of plates of magnetic material mounted on the exterior of the arc extinguisher; said plates extending from the region of the blow-out coil toward the upper end of the arc extinguisher to provide a path for the arc blow-out magnetic flux.

9. The contactor of claim 8 wherein the arc extinguisher is provided at its upper end with a plurality of metal plates extending transversely of the arc and adapted to cool to expelled arc gases.

10. The contactor and housing of claim 4 wherein a plurality of housings are provided each of modular dimension to receive the contactors; two housings for one selected size of contactor having the same vertical height as three housings for a smaller size contactor; thereby permitting the construction of a control center of uniform height.

11. The contactor and housing therefore of claim 10 wherein additional control housings are provided; each control housing having half the height of the housing for a smaller contactor enabling two housings for smaller contactors and the two control housings therefor to equal in height a set of three housings for smaller contactors and a set of two housings for larger contactors to produce a control center of uniform height.

12. The contactor and housing of claim 10 wherein further control housings are provided extending vertically along the side of the contactor housings.

13. The contactor and housing of claim 11 wherein further control housings are provided extending vertically along the side of the contactor housings and alongside the first mentioned additional control housings.

14. The contactor and housing therefor of claim 4 wherein a plurality of movable said stationary contacts are provided;

a moving contact operating shaft; said movable contactor being mounted on said operating shaft; and said armature being connected to said shaft; said biasing means being connected to said shaft to drive said shaft in a direction opposite to that in which it is driven by said armature.

15. The contactor and housing therefor of claim 14; wherein a support for the contactor in the housing is provided; and racking means are provided for moving said contacts rearwardly to a fully engaged inserted position wherein the disconnect contacts at the rear of the housing are engaged with the corresponding disconnect contacts at the rear of the contactor and forward to a withdrawn position in which the said rear disconnect contacts are fully disengaged.

16. The contactor and housing of claim 15 in which the said sliding support comprises a pair of parallel rails on said contactor extending from the front to the rear thereof; and a plurality of sets of wheels on the side walls of the housing; said rails and wheels cooperating to permit said contactor to slide readily into and out of the housing.

17. The contactor and housing of claim 16 in which a plurality of pull handles are provided extending forwardly from the side walls of the contactor.

18. The contactor and housing of claim 16 including racking mechanism to move said contactor rearwardly of said housing with said door of the housing closed; said racking mechansim comprising a bell-crank lever rotatably mounted on a side wall of said housing, a link; one end of said bell-crank lever being connected to said link; a racking shaft having a first crank; the other end of said link being connected to said first crank of said racking shaft; a second crank on said racking shaft; a slot in the outer end of said second crank; a lateral projection at the rear of said contactor; said lateral projection of said contactor engaging said slot of said second crank when the contactor is moved into the housing clear of the front thereof to permit closing of the door of said housing.

19. The contactor and housing of claim 18 comprising:
means for rotating said bell crank lever to operate said racking shaft after said contactor is inserted and said door is closed to rack said contactor rearwardly in said housing to effect interengagement of the back disconnect contacts on the contactor with the corresponding load and line disconnect contacts at the rear wall of the housing.

20. The contacts and housing of claim 19 comprising a driving member connected to the opposite end of said bell crank lever; said driving member being located at the front frame of the housing adjacent the door opening and at the side of the door opening opposite that at which the door is hinged.

21. The contactor and housing of claim 20, in which operating members for said driving member include a handle rotatably mounted for vertical movement at said section of said front frame of the housing;
a pinion secured to and rotatable with said handle; a rack engaged with said pinion and vertically slidable with respect to said frame and a connector between said rack and said other end of said bell crank lever.

22. The contactor and housing of claim 21 in which a latch is provided at said front frame; said latch being biased toward a position blocking the movement of the connector of said rack to drive said contactor toward a racked-in and engaged position; a latch operator on said door; said latch operator on said door engaging said latch and moving it to non-blocking position with respect to movement of said rack when said door is closed.

23. The contactor and housing of claim 21 in which a second latch is provided, said second latch engaging and blocking the movement of the handle and rack from a racked in position toward a racked out position; a push rod carried by a side wall of said housing and the said front frame thereof; said push rod being biased toward movement out of said front frame; said second latch being mounted on said push rod and engaging the connection between said rack and said bell crank lever;
a push button on the end of said push rod outside said door frame; said handle being rotatable toward said racked out position when said push button and push rod are pushed in to disengage said second latch.

24. The contactor and housing of claim 22 in which a second latch is provided, said second latch engaging and blocking the movement of the handle and rack from a racked in position toward a racked out position; a push rod carried by a side wall of said housing and the said front frame thereof; said push rod being biased toward movement out of said front frame; said second latch being mounted on said push rod and engaging the connection between said rack and said bell crank lever;
a push button on the end of said push rod outside said door frame; said handle being rotatable toward said racked out position when said push button and push rod are pushed in to disengage said second latch.

25. The contactor and housing of claim 23, wherein two handed operation is required to initiate the racking out operation; one hand operating said handle and one hand operating said push rod.

26. The contactor and housing of claim 23 wherein the contact shaft carries a radial projection; said projection extending in the path of movement of said push rod when said contactor is closed and preventing inward movement of said push rod in the closed position of the contactor; said projection moving out of the path of movement of said push rod when the contacts are open.

27. The contactor and housing of claim 18 in which a shutter is provided vertically movable on the back wall from a position wherein one set of stationary disconnect contacts are exposed to a position where the said set of stationary disconnect contacts are covered;
a connection between said racking shaft and said shutter; said connection moving said shutter to an exposed position of said stationary disconnect contacts as the contactor is moved toward the rear wall of said housing and moving said shutter to a covered position of said stationary disconnect contacts when said contactor, on movement thereof toward the front of the housing, has disengaged said stationary disconnect contacts.

28. The contactor and housing of claim 27 wherein said shutter is provided with at least one grounding extension; and a ground connection in said housing engageable by said grounding extension when said shutter is moved to a position covering said stationary disconnect contacts.

29. The contactor and housing of claim 27 wherein the set of stationary disconnect contacts with respect to which said shutter operates are the line disconnect contacts.

30. The contactor and housing of claim 14, wherein the contactor carries a pair of fuse clips; one upper and one lower fuse clip for each pole of said contactor; said pair of fuse clips being in series with the movable and stationary contacts of each pole.

31. The contactor and housing of claim 30 wherein the contactor has a holding magnet and carries a normally closed switch in series with said holding magnet; a tripper bar extending below the lower fuse clips of each pole; means biasing said tripper bar toward a non-trip position; said tripper bar being rotatable against said bias to open said normally closed switch to permit said contactor to be opened;
said fuse clips being adapted to receive and positon fuses of the plunger type in which a member extends from said fuse when the fuse interrupts a circuit;
said lower fuse clip of each pole being adapted to position the plunger of a fuse which has interrupted a circuit to engage and rotate said tripper bar to cause the contactor to open.

32. The contactor and housing of claim 14 in which the contact operating shaft carries a crank arm; an ON-OFF indicator arm carried by said housing and extending from the rear of the housing to the front of the housing; a window in the door of the housing registering with the front end of said ON-OFF indicator arm; said arm being pivotally mounted for vertical movement at a point in said housing between the said contact operating shaft crank and the front of the housing when the contactor is fully inserted in said housing; said crank engaging the portion of the arm rearwardly of said pivot in one position of said contact shaft and disengaging said portion of said arm in another position of said contact shaft to move the front end of said arm to rise and to permit it to fall in accordance with the closed or open position of the contact shaft.

* * * * *